United States Patent
Eng et al.

(10) Patent No.: US 12,342,052 B2
(45) Date of Patent: Jun. 24, 2025

(54) SELECTIVE MODIFICATION OF CONTENT OUTPUT TO ENHANCE USER EXPERIENCE

(71) Applicant: Comcast Cable Communications, LLC, Philadelphia, PA (US)

(72) Inventors: Adam Eng, Golden, CO (US); David Eng, Louisville, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 95 days.

(21) Appl. No.: 18/307,359

(22) Filed: Apr. 26, 2023

(65) Prior Publication Data

US 2024/0364976 A1     Oct. 31, 2024

(51) Int. Cl.
*H04N 21/488* (2011.01)
*H04N 21/45* (2011.01)
*H04N 21/4722* (2011.01)

(52) U.S. Cl.
CPC ..... *H04N 21/4884* (2013.01); *H04N 21/4532* (2013.01); *H04N 21/4722* (2013.01)

(58) Field of Classification Search
CPC ................................................ H04N 21/4884
See application file for complete search history.

(56) References Cited

U.S. PATENT DOCUMENTS

| | | | |
|---|---|---|---|
| 7,487,096 B1* | 2/2009 | Cox | G10L 15/187 704/277 |
| 9,564,177 B1* | 2/2017 | Gray | G11B 27/007 |
| 10,038,942 B2 | 7/2018 | Chen et al. | |
| 10,637,940 B2 | 4/2020 | Hollinger | |
| 10,938,871 B2 | 3/2021 | Wood et al. | |
| 10,979,749 B2 | 4/2021 | Pont et al. | |
| 11,122,332 B2 | 9/2021 | Dang et al. | |
| 2016/0173941 A1 | 6/2016 | Gilson et al. | |
| 2016/0274744 A1* | 9/2016 | Neumann | H04N 21/47202 |
| 2018/0146259 A1* | 5/2018 | Hollinger | H04N 21/4667 |
| 2019/0028751 A1 | 1/2019 | Bolot et al. | |
| 2022/0295131 A1 | 9/2022 | Shah et al. | |

* cited by examiner

*Primary Examiner* — Michael H Hong
(74) *Attorney, Agent, or Firm* — Banner & Witcoff, Ltd.

(57) ABSTRACT

Systems, apparatuses, and methods are described for selectively modifying output of one more portions of a content item. Selective modifications may comprise enabling closed captioning for portions with difficult-to-understand dialogue, alerts of upcoming portions of a content item, skipping or replaying portions of a content item, volume adjustments, and/or contrast adjustments. Output modification may be automatic or partially automatic (e.g., based on acceptance after a prompt).

20 Claims, 23 Drawing Sheets

─ 420

When would you like to use closed captioning?

421 → ☐ For parts that other people found hard to hear or understand

422 → ☐ For parts where overall volume is low or where volume of background sounds is high 423 → ☐ For parts where a speaker has an accent 424 → ☐ For parts where specific persons are speaking

Would you like to us to monitor for potential distractions during <content item> and provide alerts of when important parts of <content item> are about to start?

431 → ☐ Yes

SELECTIVE MODIFICATION OF CONTENT OUTPUT TO ENHANCE USER EXPERIENCE

BACKGROUND

When viewing (e.g., watching and/or listening to) movies, television programs, sports programs, videos, and/or other types of content items, users may become frustrated for any of numerous reasons. For example, some portions of dialogue in a content item may be difficult to understand because of volume inconsistencies, accents of persons speaking dialogue, etc. As another example, users may become distracted during content output and may miss important portions of a content item, resulting in confusion during output of subsequent portions of the content item. Frustration may also arise from poor lighting in a content item, from uninteresting portions of a content item, and/or other sources. Although some or all of these issues may be addressable, at least in part, by output controls available to users, using such output controls may be time-consuming and/or tedious, thereby increasing user frustration. These and other shortcomings are addressed in the disclosure.

SUMMARY

The following summary presents a simplified summary of certain features. The summary is not an extensive overview and is not intended to identify key or critical elements.

Systems, apparatuses, and methods are described for automating, in whole or in part, modifications to output of one more portions of a content item. A content item may be analyzed to determine portions of that content item having characteristics that may diminish a user experience during output of that content item to a user. Those portions may, for example, comprise portions of the content item in which dialogue may be difficult to understand, portions of the content item that users may consider important and for which a lack of user attention may diminish enjoyment of the content item, portions that other users have skipped, portions with excessive or inadequate audio volume, and/or portions with dark video. Such portions may be determined using data indicating actions of previous viewers of the content item, using software analysis of audio and/or video of the content item, and/or using other sources of information. Based on determining these portions of the content item, a user may be provided with one or more options to modify output of those portions. For example, a user may be provided with an option to enable closed captioning for portions with difficult-to-understand dialogue, an option to receive an alert of upcoming important portions, an option to skip portions that previous users skipped, and/or other options.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIGS. 4A, 4B, 4C, 4D, and 4E show example user interfaces for receiving user input regarding selective content output modification.

DETAILED DESCRIPTION

Figure 1:
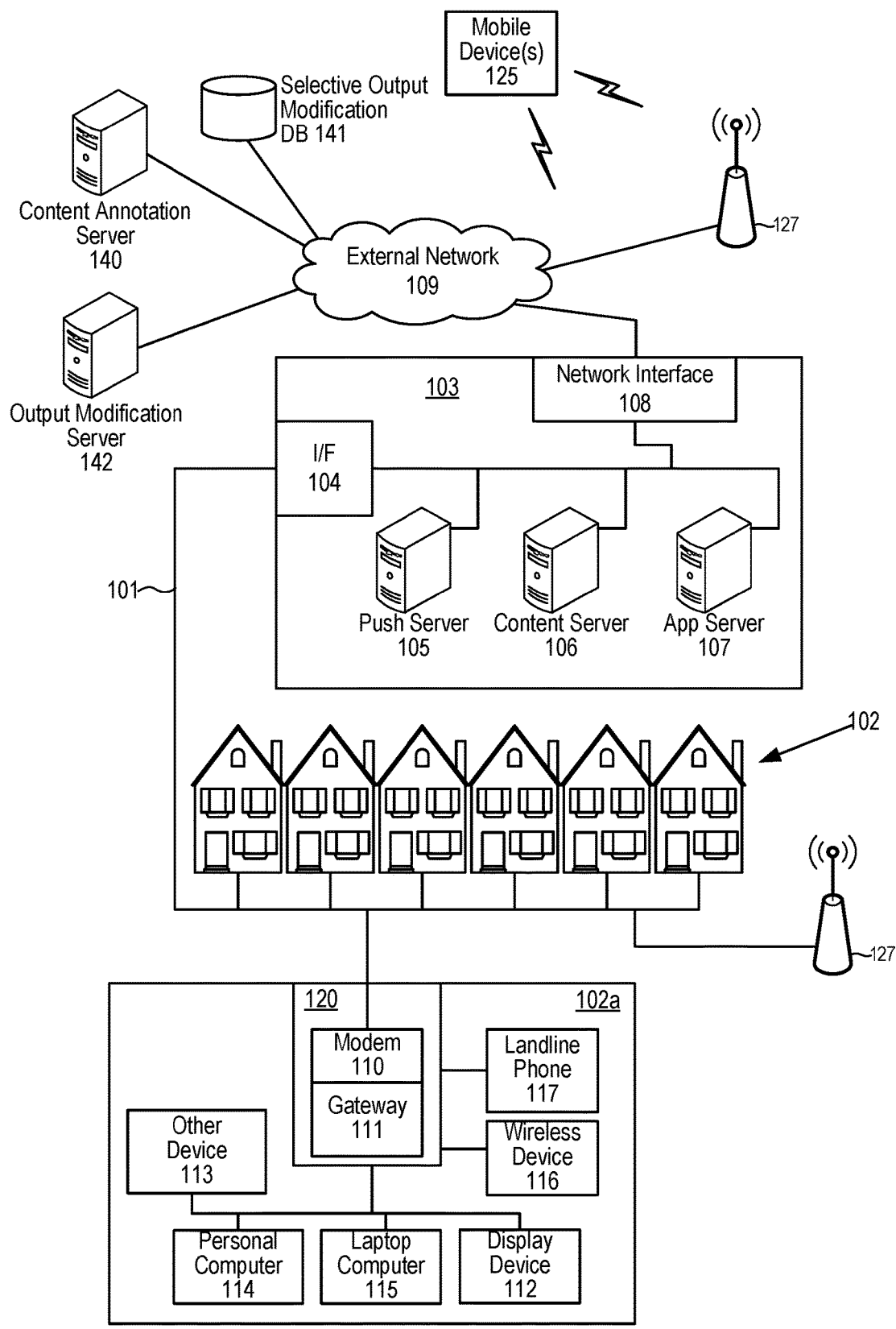
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

A user to whom a movie, a television program, a sporting event, a video (e.g., a video uploaded by an individual to a video hosting service, a news clip, etc.), and/or other type of content item is being output may wish to selectively alter output of that content item in one or more ways. For example, a user may wish to enable closed captioning for portions of a content item in which dialogue may be difficult to understand, to skip or fast-forward (e.g., using a fast forward trick play feature) through portions of the content item that the user finds uninteresting or objectionable, to replay (e.g., using a rewind trick play feature) portions that are interesting or that may be difficult to understand, to increase volume for portions that may be hard to hear, to adjust video contrast for portions that appear very dark, and/or to make other modifications. Described here are systems and methods that allow a user partially or fully automate such selective output modification, thereby improving the user's experience when viewing (e.g., watching and/or listening to) a content item.

The herein-described systems and methods may also help prevent user frustration associated with missing important or popular portions of a content item. For example, a user may sometimes interact with one or more second user devices (e.g., smart phones, tablets, etc.) while a content item is being output view a first user device (e.g., a television or display screen). If that user is focused on the second computing device, the user may lose focus on the first computing device. If this happens at a time when an important portion (or a popular portion) of a content item is being output via the first computing device, the user may miss that important portion. An important portion of a content item may comprise a portion of a movie or television program that is important to understanding later portions of that movie or television show, a scoring play in a sporting match, a major news story, and/or other portions of content items. To help prevent this from occurring, the herein-described systems and methods may comprise selective modification of content output to alert a user of upcoming important portions of a content item. Optionally, output of such alerts could be further based on whether there are one or more indications that the user is distracted. Such an indication may, for example, comprise data (e.g., from a gateway device in communication with the first and second user devices) indicating the multiple devices are being used during output of the content item.

To facilitate selective modification of content item output, a content item may be annotated to indicate portions associated with selective output modification. Annotation may, for example, comprise generation and/or modification of metadata to indicate content item segments that may be selectively modified and/or that may be associated with outputting a prompt to a user indicating an option to selectively modify output of an upcoming portion. Content item annotation may be based on one or more types of data. For example, previous viewers of a content item may have enabled closed captioning and/or increased volume for portion portions of a content item that those viewers had difficulty understanding or hearing, may have fast-forward through uninteresting portions, may have replayed portions that those viewers considered important, may have modified video contrast settings for portions those viewers considered too dark, etc. The actions of those previous viewers may be tracked and data from that tracking used to annotate the content item. Also or alternatively, annotation may be based on audio and/or video analysis of a content item, based on data received from social media, based on synopses and/or other data received from a content provider, based on transcripts of content items, and/or based on other sources. Data received one or more types of previous viewer actions may indicate portions of a content item that those previous viewers considered important.

To further improve the experience of a user, a user device via which a content item (and/or modified portions of the content item) is output may receive multiple streams. A first stream may comprise data for a version of the content item without modification. A second stream may comprise data for a version of the content item with one or more modifications. If the user reaches a portion of the content item for which the user desires modified output, the user device may change the source of data used for output from the first stream to the second stream. For at least some types of modifications (e.g., fast forward/skipping and/or replay), use of a second stream for modified output may increase the speed with which the modified portion is output and may avoid or reduce latency. For some types of modifications (e.g., changing contrast or other characteristics of a video display) use of a second stream for modified output may reduce potential problems associated with attempting to remotely control a user device (e.g., a video display screen). Also or alternatively, some types of output modification may be performed using a single stream and by instructing a user device to take action (e.g., locally generate closed captioning, locally generate a prompt or an alert, increase volume of a speaker, etc.).

As explained in more detail herein, one or more computing devices may implement one or more methods to determine portions of a content item to associate with modified output. Those portions may be determined based on data from previous viewers of the content item and/or based on other data. The one or more computing devices may cause options for modified output to be presented to a user. The one or more computing devices may cause (e.g., by sending metadata comprising output modification instructions) modified output of portions of the content item associated with those options.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a Wi-Fi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers in communication with other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (and/or an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as additional push, content, and/or application servers, and/or other types of servers. Also or alternatively, one or more servers may be part of the external network 109 and may be configured to communicate (e.g., via the local office 103) with computing devices located in or otherwise associated with one or more premises 102.

For example, a content annotation server 140 may communicate with the local office 103 (and/or one or more other local offices), one or more premises 102, one or more access points 127, one or more mobiles devices 125, and/or one or more other computing devices via the external network 109. The content annotation server 140 may determine segments of content items for which modified output may be offered, may generate and/or modify metadata to indicate such segments, may generate modified versions of segments (e.g., segments transcoded to change contrast, closed captioning added to segments, etc.), may cause storage of metadata and/or of modified segments in a selective output modification database 141, and/or may perform other operations, as described below. An output modification server 142 may receive metadata and/or modified segments from the database 141 and may cause modified output, via one or more user devices, of a content item associated with the received metadata and/or modified segments. Also or alternatively, the server 140, the database 141, and/or the server 142 may be located in the local office 103, in a premises 102, and/or elsewhere in a network. Also or alternatively, the push server 105, the content server 106, the application server 107, the content annotation server 140, the selective output modification database 141, the output modification server 142, and/or other server(s) may be combined. The servers 105, 106, 107, 140, and 142, the database 141, and other servers, may be computing devices and may comprise memory storing data and also storing computer executable instructions that, when executed by one or more processors, cause the server(s) to perform steps described herein. Although the content annotation server 140 is shown as a single server for simplicity, operations performed by the content annotation server 140 may be distributed among and or performed by multiple computing devices. Similarly, operations performed by the selective output modification database 141 and/or the content modification server 142 may be distributed among and or performed by multiple computing devices.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise (and/or otherwise perform operations of) a set-top box (STB), digital video recorder (DVR), a digital transport adapter (DTA), a computer server, a router, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g. Voice over Internet Protocol-VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, process, and/or otherwise use data associated with content items. A content item may comprise a video, a game, one or more images, software, audio, text, webpage(s), and/or other type of content. One or more types of data may be associated with a content item. A content item may, for example, be associated with media data (e.g., data encoding video, audio, and/or images) that may be processed to cause output of the content item via a display screen, a speaker, and/or other output device component.

Figure 2:
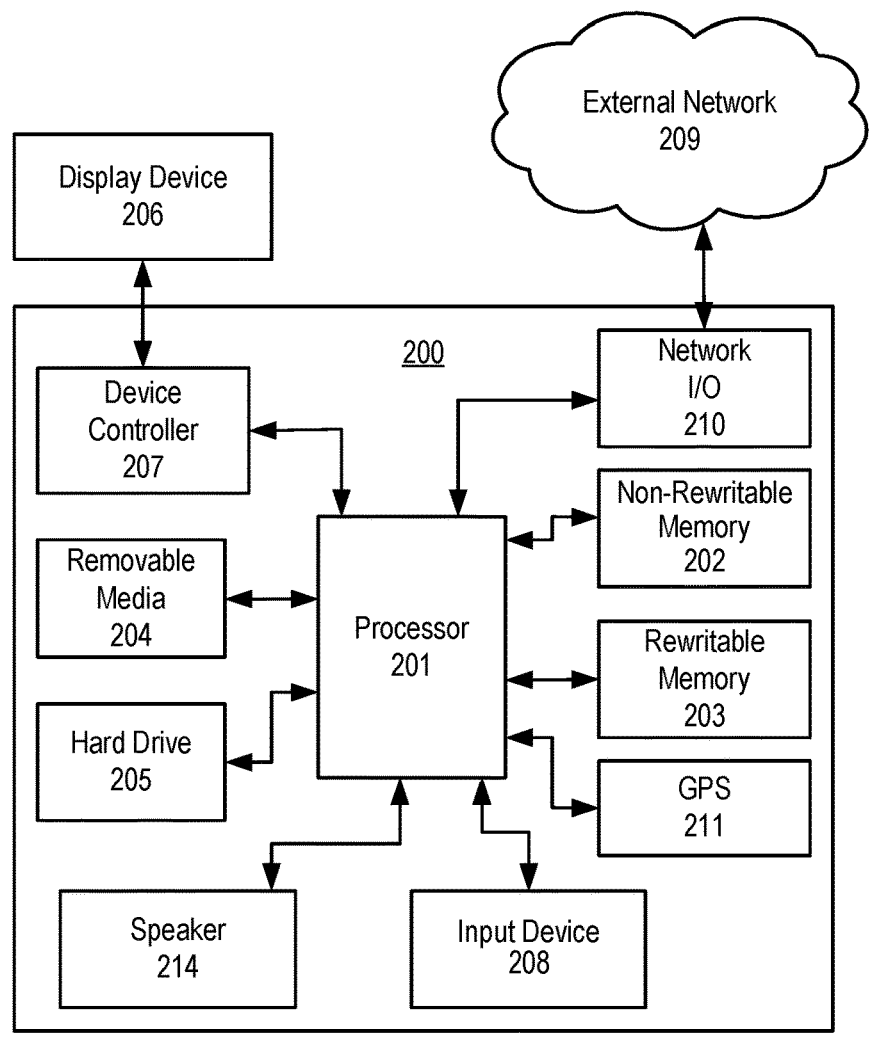
FIG. 2 shows example hardware elements of a computing device.
Figure 3:
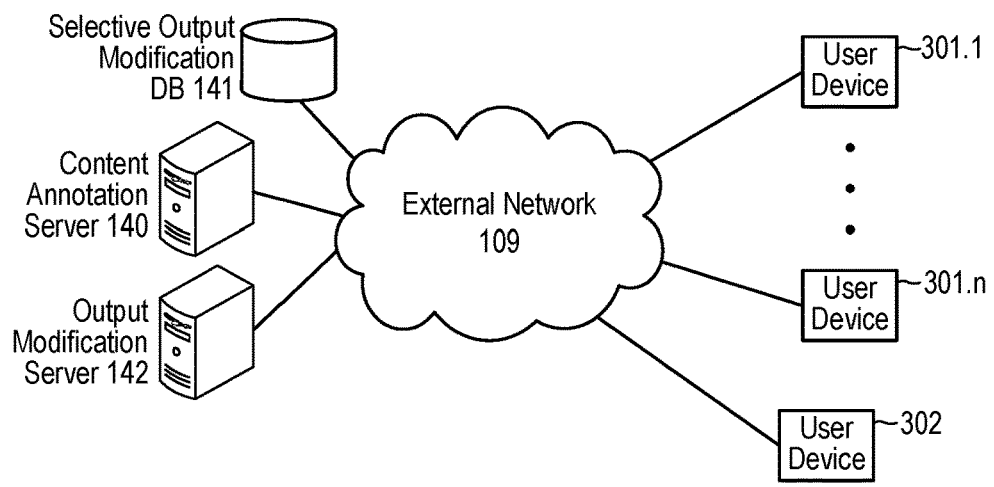
FIG. 3 shows an example of an environment in which a content annotation server, a selective output modification database, and an output modification server may interact with one or more user devices.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, the content annotation server 140, the selective output modification database 141, the output modification server 142, any devices that are part of or associated with the external network 109) and any other computing devices discussed herein (e.g., the user devices 301 and 302 described in connection with FIG. 3). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output components, such as a display device 206 (e.g., an external television and/or other external or internal display device) and a speaker 214, and may comprise one or more output device controllers 207, such as a video processor or a controller for an infra-red or BLU-ETOOTH transceiver. One or more user input devices 208 may comprise a remote control (which may itself be a computing device), a keyboard, a mouse, a touch screen (which may be integrated with the display device 206), a microphone, etc. The computing device 200 may, for example receive sounds of speech input via a microphone. The processor 201 may (e.g., using one or more analog-to-digital (A/D) converters, digital signal processors (DSPs), and/or other components) digitize and/or otherwise generate audio data that is representative of the speech input. Also or alternatively, the computing device may comprise (e.g., in addition to the processor 201) one or more A/D converters, DSPs, and/or other components that generate audio data that is representative of the speech input. The processor 201 and/or other components of the computing device may send speech data to one or more other computing devices, may receive (e.g., via network input/output (I/O) interface 210, described below) speech data generated by another computing device, may perform speech recognition processing of speech data, and/or may perform other operations associated with speech data.

The computing device 200 may also comprise one or more network interfaces, such as the network I/O interface 210 (e.g., a network card), to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

FIG. 3 shows an example of an environment in which the content annotation server 140, the output modification database 141, and the output modification server 140 may interact, via the external network 109, with one or more user devices to perform one or more of the operations described herein, and in particular, to determine potential output modifications for a content item and/or to facilitate output of that content item with some or all of those modifications. Although FIG. 3 and subsequent drawing figures will refer to a single content item for convenience, the operations described in connection with FIG. 3 and other drawing figures may be performed in connection with multiple different content items of many different types.

Each of user devices 301.1 through 301.*n* (collectively referred to as the user devices 301, generically referred to as a user device 301) and a user device 302 may be a computing device via which the content item is output to one or more users. The value of n may be large, and the user devices 301 may comprise thousands of separate computing devices. Each of the user devices 301 and the user device 302 may comprise a gateway such as the gateway 120, a display device such as the display device 112, a television, an STB, a mobile device such as the mobile device 125, a wireless devices such as the wireless device 116, and/or another type of computing devices via which content may be output to users. As the content item is output via the user devices 301, users may cause portions of that output to be modified. For example, at least some of those users may provide input that causes user devices to execute one or more trick play functions such as fast forward, rewind, etc. Also or alternatively, at least some of those users may provide input that causes enabling and/or disabling of closed captioning at one or more points in the content item, that increases and/or decreases audio volume at certain points in the content item, and/or that otherwise causes a modification to output of one of more portions of the content item. Data indicating each of the output-modifying inputs provided by users of the user devices 301, as well as points in the content item at which those inputs occur, may be captured and stored by the content annotation server 140 and/or by one or more other servers. For example, each of users' inputs via remote controls associated with user devices 301 may be logged and indexed to times, during a runtime of the content item, when the inputs are received. Inputs may comprise button presses on a remote control, voice commands, etc. User's inputs may also be tracked in other ways. For example, some user devices may comprise media player applications executing on a user device 301, and user inputs to such applications may similarly be logged and indexed to times, during the runtime of the content item, when the inputs are received.

As described in more detail below in connection with FIGS. 8E-8J, the content annotation server 140 may analyze the data indicating inputs to the user devices 301 associated with previous outputtings of the content item. Based on that analysis, the server 140 may determine segments of the content item that are associated with selective output modification. Those determined segments may comprise segments for which output may, if desired by a subsequent viewer of the content item, be modified. Those determined segments may also comprise segments during which a prompt may be output to the subsequent viewer to indicate upcoming segments for which output modification is available. The server 140 may also generate, or cause generation of, alternate versions of segments for which output may be modified. Such generation may, for example, comprise transcoding and/or other types of modification.

The user device 302 may be associated with a subsequent viewer to whom the content item may be output, and who may be provided one or more options for preconfigured modification of output of that content item. As explained in more detail below, the user of the user device 302 may be presented with one or more interfaces via which that user may indicate if preconfigured output modification is desired, the extent to which preconfigured output modification is desired, and/or whether further prompting is desired. Based on those indications provided by the user of the user device 302, the output modification server 142 may cause none, some, or all of the output modifications determined by the content annotation server 140 for the content item.

FIGS. 4A-4E show example user interfaces for receiving user input regarding selective output modification for the content item. The user interfaces of FIGS. 4A-4E may be output to the user of the user device 302 based on a request, from that user via the user device 302, for output of the content item discussed above in connection with FIG. 3. Also or alternatively, one or more of the interfaces of FIGS. 4A-4E, and/or other interfaces configured to receive similar inputs, may be presented at other times (e.g., during configuration of a user or user device profile) and inputs applied to output of multiple content items.

Figure 4A:
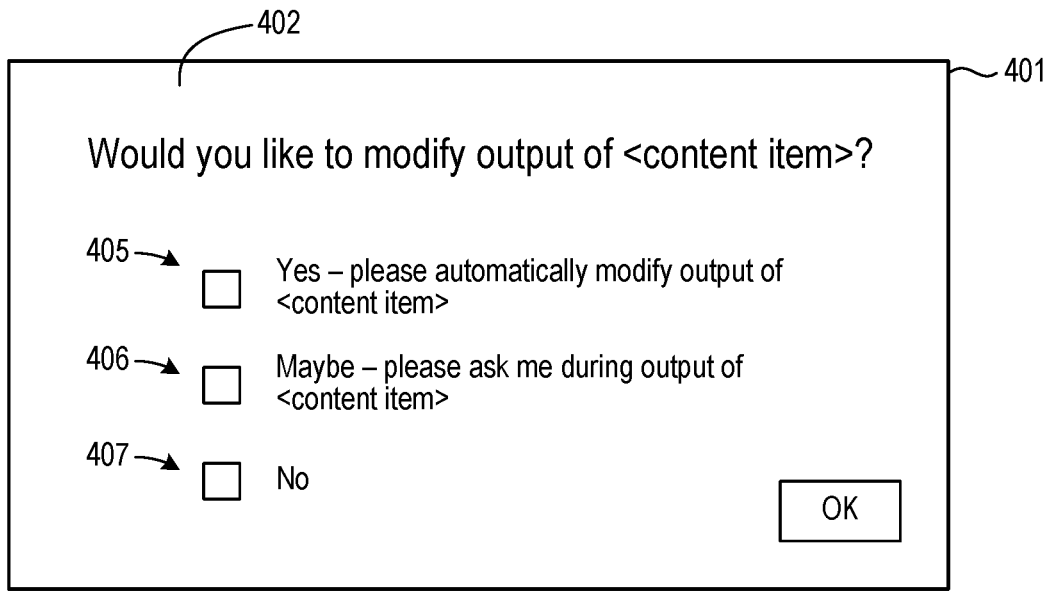

As shown in FIG. 4A, a user interface 402 may be output via a display device 401 comprised by or otherwise associated with the user device 302. The interface 402 may prompt the user to indicate whether the user wishes to modify output of the content item. A user may provide input selecting one of the options of interface 402, and/or of other interfaces described below, by selecting a box associated with an option (e.g., by manipulating up/down and/or left/right buttons of a remote control and pressing an enter key, by selecting with a mouse, by touching a touch-screen) or by selecting boxes associated with multiple options, and by then selecting an "OK" button in the interface. By selecting option 405, the user may indicate that the user wishes output modifications to be automatically implemented (e.g., without requiring further user input). By selecting option 406, the user may indicate that the user wishes to be prompted when an output modification is available. By selecting option 407, the user may indicate that no output modifications are desired.

Figure 4B:
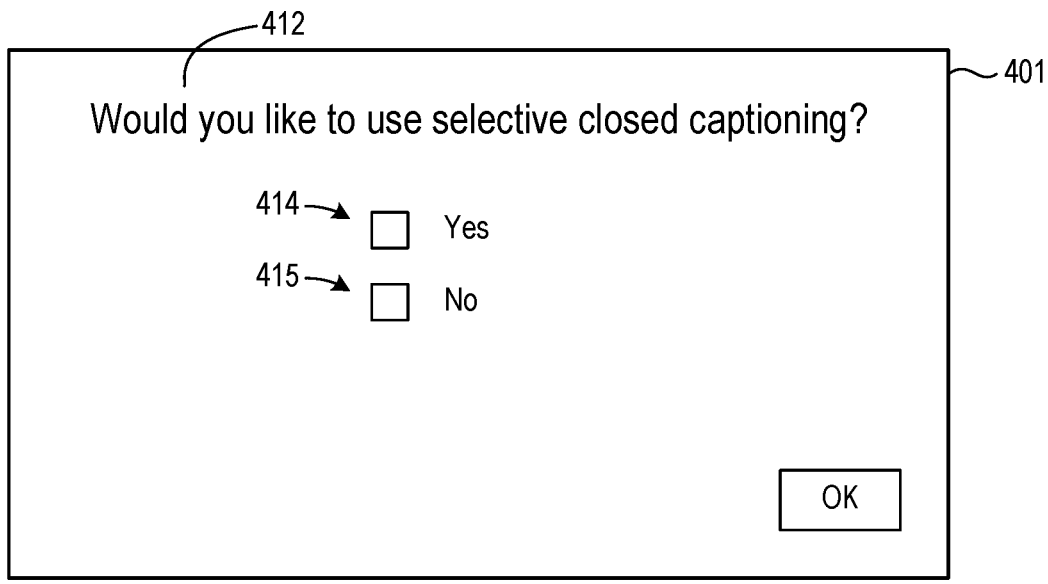

If option 405 or 406 is selected, interface 412 of FIG. 4B may be output via the display device 401. The interface 412 may prompt the user to indicate if the user would like to use selective closed captioning. If the user selects option 415 (No), the content item may be output without preconfigured selective closed captioning, and an interface 430 (described in connection with FIG. 4D) may be output. If the user selects option 414 (Yes), an interface 420 may be output.

As shown in FIG. 4C, the interface 420 may be output via the display device 401 to prompt the user for input indicating one or portions of the content item for which selective closed captioning may be desired. By selecting an option 421, the user may provide input indicating that closed captioning may be desired for portions of the content item that other viewers found hard to understand. By selecting an option 422, the user may provide input indicating that closed captioning may be desired for portions of the content item in which volume is low and/or in which volume associated with non-dialogue background sounds is high. By selecting an option 423, the user may provide input indicating that closed captioning may be desired for portions of the content item in which dialogue is associated with a speaker having an accent. By selecting an option 423, the user may provide input indicating that closed captioning may be desired for portions of the content item in which dialogue is associated with one or more specified actors or other persons associated with dialogue in the content item. Selection of the option 424 may cause output of a further interface, not shown, that allows a user to select persons speaking in the content item (e.g., one or more actors in a cast).

FIG. 4D shows an interface 430 that may be presented to the user via the display device 401 to prompt the user for input indicating whether the user desires monitoring for potential distractions and to be provided with alerts when important portions of the content item are about to begin. Monitoring may, for example, comprise monitoring for communications via a gateway with one or more devices different from user device 302. Also or alternatively, monitoring may comprise monitoring images from a camera associated with user device 302 for images indicating a user is looking away from the display device 401. Also or alternatively, monitoring may comprise monitoring audio from a microphone associated with the user device 302 (and/or another microphone in proximity to the user device 302, such as a microphone of a remote control or of a home automation device) for conversation. By selecting an option 431, the user may provide input indicating that the user desires monitoring and alerts. By selecting an option 432, the user may provide input indicating that the user does not desire monitoring and dos not desire alerts. Also or alternatively, the user may be provided with an option to indicate that alerts are desired, but that monitoring is not desired. Also or alternatively, alerts may be provided without monitoring (e.g., alerts may be output regardless of whether the user is distracted), and no options may be presented for monitoring.

Figure 4E:
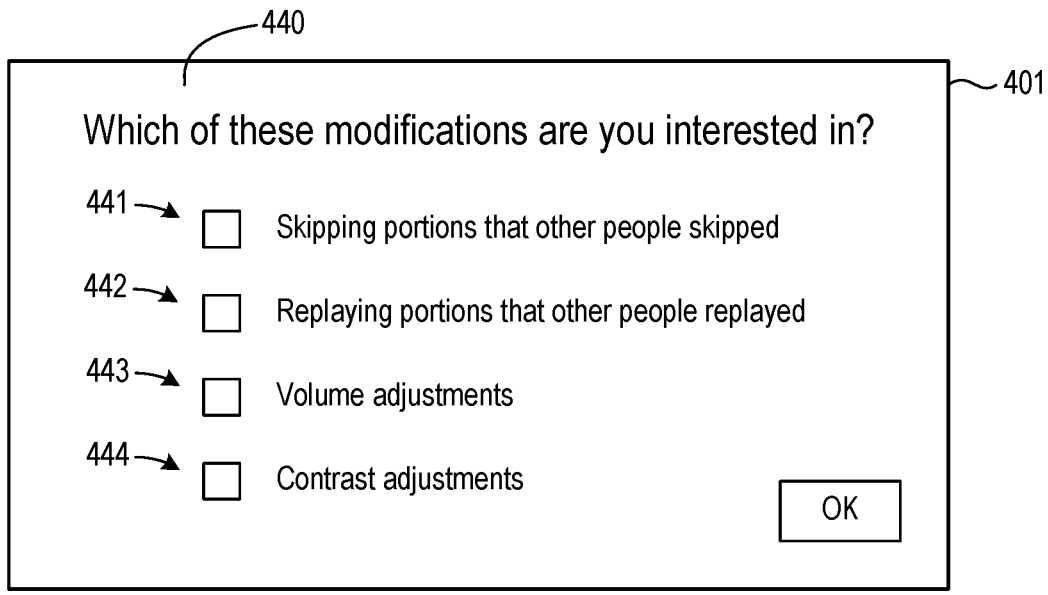

FIG. 4E shows an interface 440 that may be presented to the user via the display device 401 to prompt the user for input indicating whether other types of output modifications are desired. By selecting an option 441, the user may provide input indicating that the user may desire output modifications that skip portions of the content item that other viewers skipped (e.g., fast-forwarded through). By selecting an option 442, the user may provide input indicating that the user may desire output modifications that replay portions of the content item that other viewers replayed. By selecting an option 443, the user may provide input indicating that the user may desire output modifications that adjust audio volume in portions of the content item where other viewers adjusted volume. By selecting an option 444, the user may provide input indicating that the user may desire output modifications that adjust video contrast in dark portions of the content item.

Figure 5A:
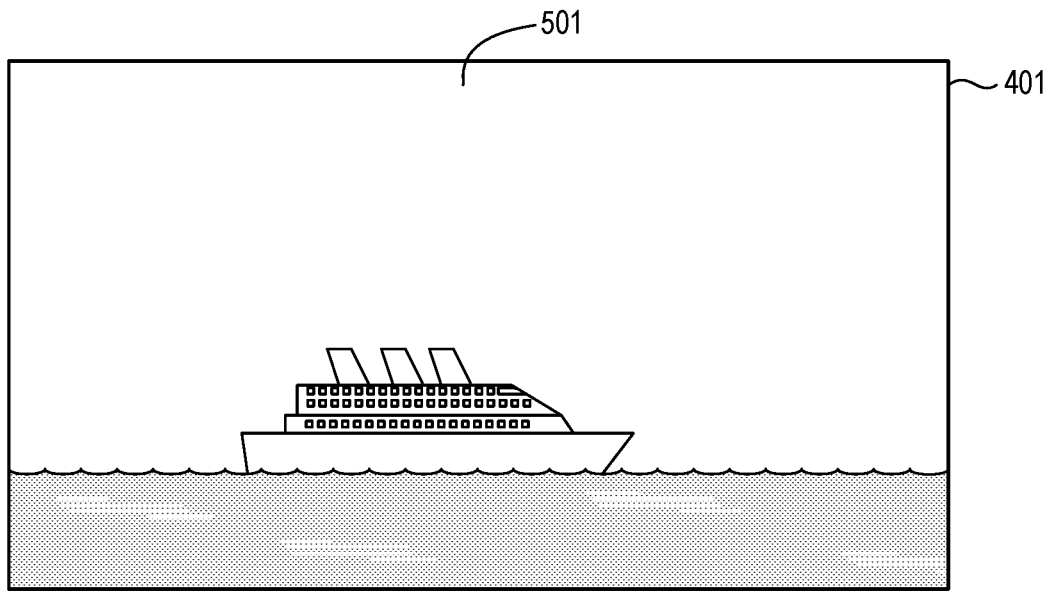
FIGS. 5A, 5B, 5C, 5D, 5E, and 5F show examples of selective modification of content output.
Figure 5B:
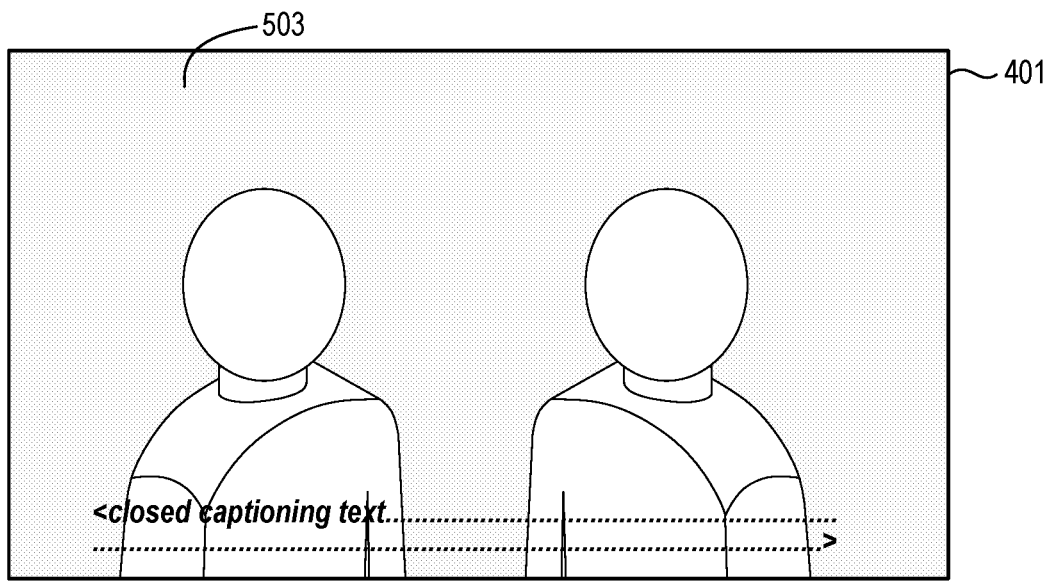
Figure 5C:
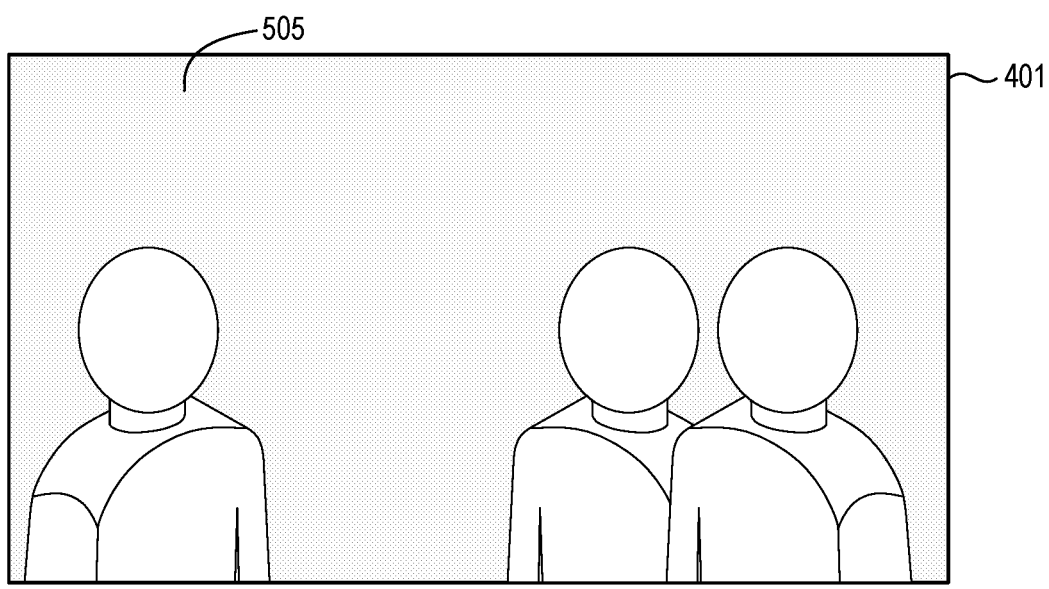

FIGS. 5A through 5C show an example of automated modified outputting, without further prompting, of the content item to include preconfigured selective closed captioning. In particular, the example of FIGS. 5A through 5C assume that the user selected option 405 in the interface 402 (FIG. 4A), option 414 in the interface 412 (FIG. 4B), and one or more of options 421-424 in the interface 420 (FIG. 4C). FIG. 5A shows a portion 501 of the content item for which preconfigured selective closed captioning is not output (e.g., the output of the portion 501 is not modified to include closed captioning). For example, the portion 501 may contain no dialogue, and/or the portion 501 may comprise dialogue for which the content annotation server 140 may have determined that selective closed captioning is not to be provided (e.g., because no or few previous viewers enabled closed captioning for portion 501), and/or the portion 501 may comprise dialogue from one or more persons not selected (e.g., after selecting option 424 of FIG. 4C) by the user. FIG. 5B shows a portion 503 of the content item that follows (e.g., immediately follows) the portion 501 and that is associated with selective closed captioning. In particular, the portion 503 may comprise dialogue for which the content annotation server 140 determined that selective closed captioning is to be available. Closed captioning associated with the portion 503 may begin with the beginning of the portion 503. Because the user selected the option 405, no additional input is needed from the user for the closed captioning to be included in output of the portion 503. FIG. 5C shows a portion 505 of the content item that follows (e.g., immediately follows) the portion 503 and for which preconfigured selective closed captioning is not output (e.g., the output of the portion 505 is not modified to include closed captioning). Closed captioning may be automatically turned off, without further input from the user, at the end of the portion 503 or at the beginning of the portion 505. The portion 505 may comprise dialogue for which the content annotation server 140 may have determined that selective closed captioning is not to be provided (e.g., because no or few previous viewers enabled closed captioning for portion 505), and/or the portion 505 may comprise dialogue from one or more persons not selected (e.g., after selecting option 424 of FIG. 4C).

Figure 5D:
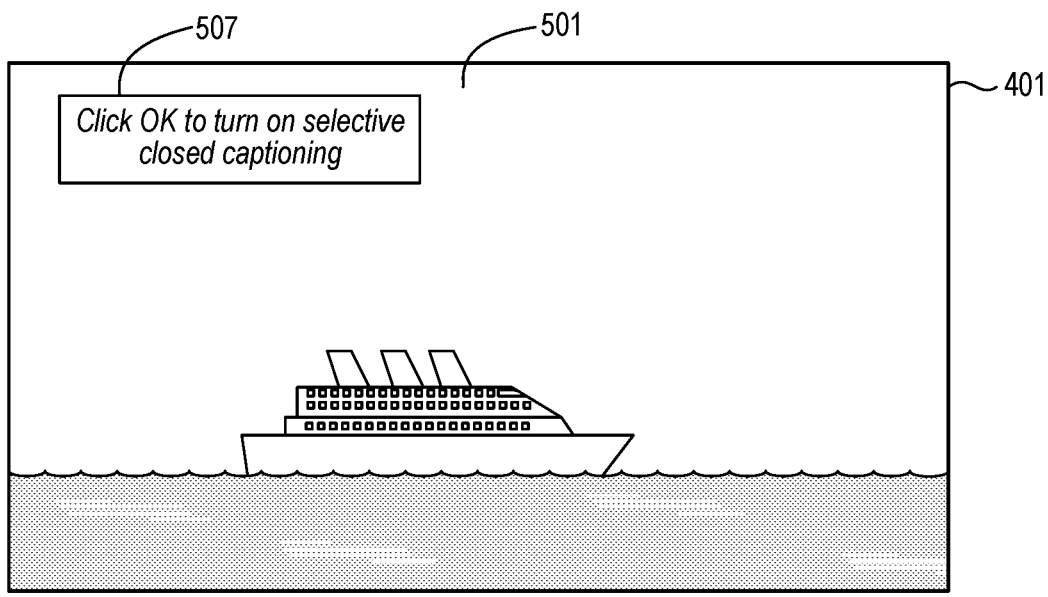
Figure 5E:
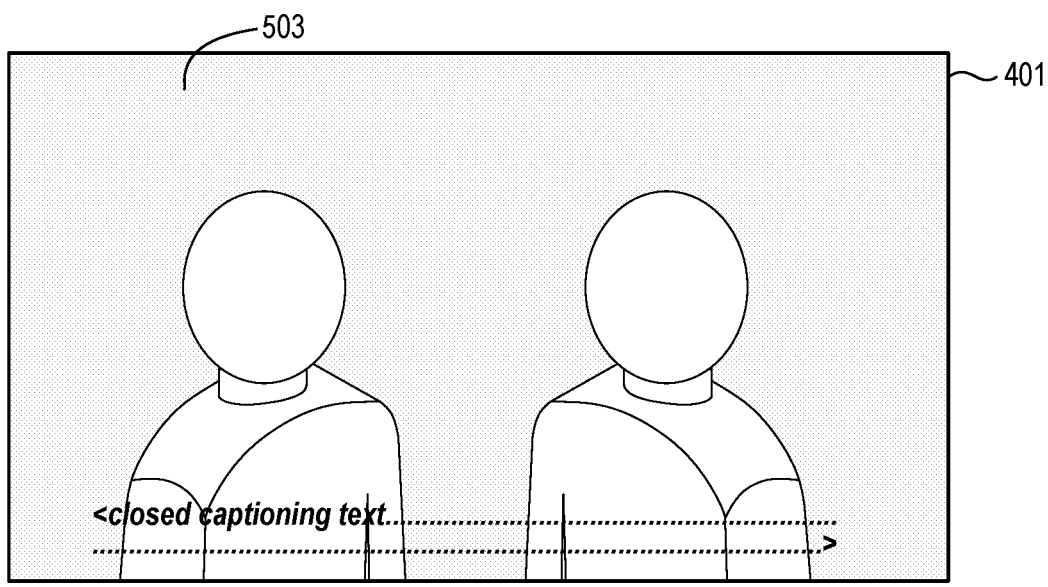
Figure 5F:
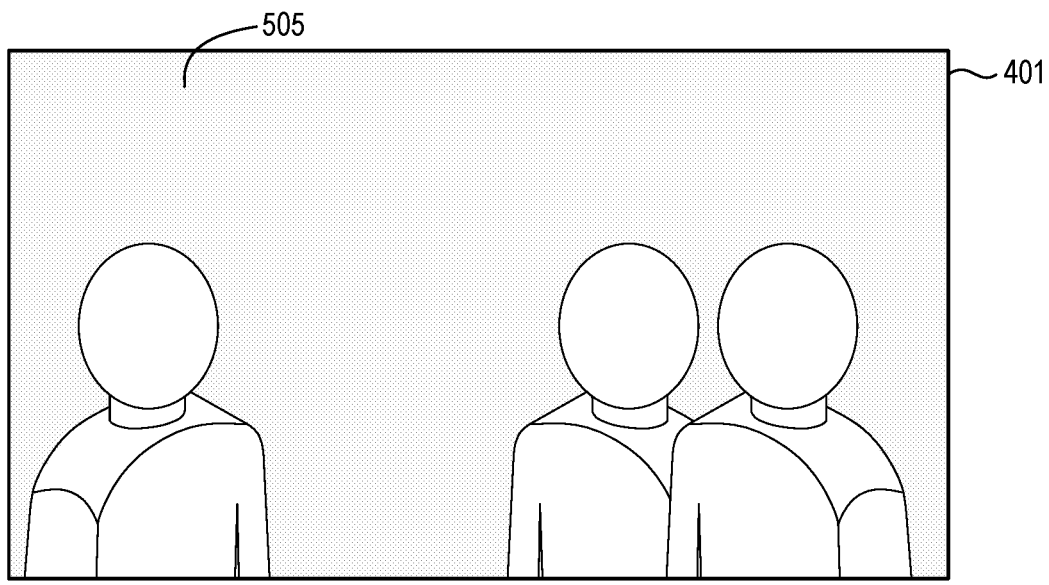

FIGS. 5D-5F show an example of automated modified outputting, with further prompting, of the content item to include selective closed captioning. The example of FIGS. 5D-5F assumes that the user selected option 406 in the interface 402 (FIG. 4A), option 414 in the interface 412 (FIG. 4B), and one or more of options 421-424 in the interface 420 (FIG. 4C). FIG. 5D, similar to FIG. 5A, shows the portion 501 of the content item for which preconfigured selective closed captioning is not output. Unlike the example of FIGS. 5A-5C, however, the user in the example of FIGS. 5D-5F has indicated that prompting is desired before a portion of the content item associated with available output modification. As shown in FIG. 5D, a prompt 507 is thus added to the portion 501. The prompt 507 indicates that the user may accept the option associated with the prompt (by clicking "ok") to turn on selective closed captioning. If the user does not accept the option, selective closed captioning is not turned on. The prompt 507 may, for example, be associated with a timer that may be started when the prompt 507 is initially output. Output of the prompt 507 may continue until the user accepts the option associated with the prompt or until the timer expires. In the example of FIGS. 5D-5F, however, the user does accept the option. Accordingly, and as shown in FIG. 5E, output of the portion 503 (that immediately follows the portion 501) is modified to include preconfigured selective closed captioning. As explained in connection with the example of FIGS. 5A-5C, closed captioning may be automatically turned off, without further input from the user, at the end of the portion 503 or at the beginning of the portion 505. As shown in FIG. 5F, the portion 505 may thus be output without closed captioning.

Figure 6:
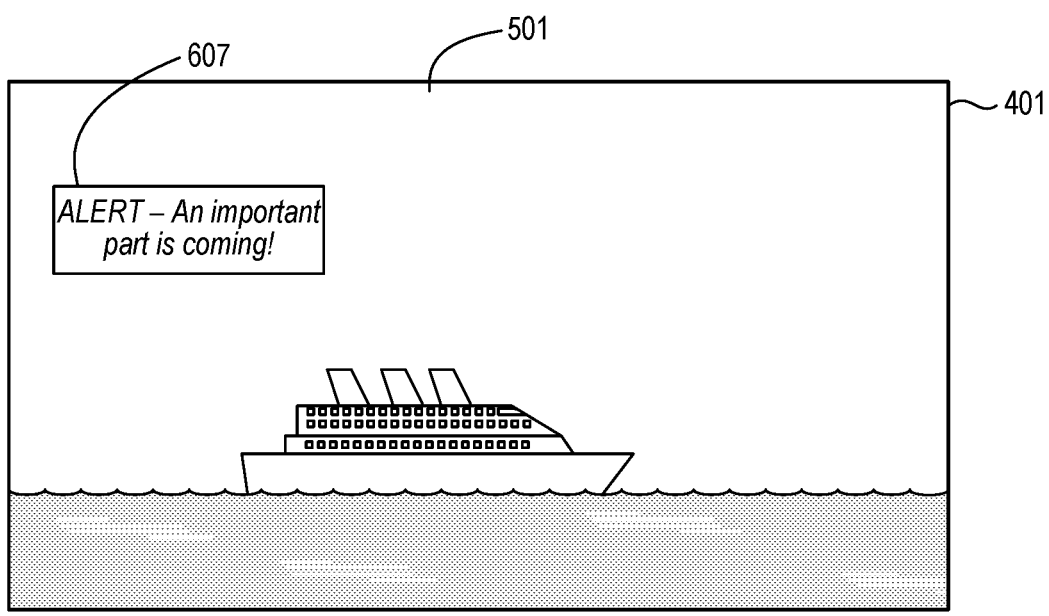
FIG. 6 shows an example of an alert associated with an upcoming important portion of a content item.

FIG. 6 shows an example of an alert associated with an upcoming important portion (e.g., an important scene) of a content item. The example of FIG. 6 assumes that the user selected option 405 in the interface 402 (FIG. 4A) and option 431 in the interface 430 (FIG. 4D). For convenience, the example further assumes that the portion 503 of the content item following the portion 501 was determined by the content annotation server 140 to be an important portion of the content item. Although a portion of a content item may be determined important and may be associated with selective closed captioning, one does not necessarily imply the other (e.g., a content item may be determined important but may not be associated with selective closed captioning, and vice versa). The example of FIG. 6 further assumes that one or more indications of distraction, of one or more users associated with the user device 302, have been received. Based on the upcoming important portion 503, and because of the received indication of user distraction, the output of the portion 501 is modified to include the alert 607. The alert 607 may be a video alert, but an alert may also or alternatively comprise an audio alert (e.g., a beep or other tone(s) output via a speaker associated with the user device 302). Also or alternatively, an alert may be output, during and/or after output of the important portion, to prompt a user to provide input to select an option to restart output of the important portion and/or to replay the important portion. If the user accepts the option (e.g., by clicking "ok"), output of the content item may be modified to restart at the beginning of the important portion.

FIGS. 7A-7E are diagrams showing example relationships between portions of content items and modified output, via the display device 401, of portions of those content items. In FIGS. 7A-7E, the content items may comprise segments s that comprise audio and video data for relatively short portions (e.g., 1-2 seconds) of the total runtimes of the content items. Each of the segments s may correspond to a metadata element md. To simplify explanation, details are only included in metadata elements md that are pertinent to the examples. The metadata elements md may comprise data other than what is shown in FIGS. 7A-7E, and an absence of detail in a particular metadata element md should not be construed as an indication that the metadata element md lacks data other than what may be shown. FIGS. 7A-7E show corresponding segments s and metadata elements md adjacent to one another to simplify explanation. However, metadata elements md may comprise any of multiple possible formats and/or need not be physically stored or transmitted physically adjacent to corresponding segments s. For example, multiple metadata elements md may be part of a single file or other data construct, with the relevant portions of that data construct indexed to corresponding segments s. In FIGS. 7A-7E, variables i, j, k, m, p, q, r. v, w, and x may be arbitrary positive integer values, and an ellipsis represents the presence of an arbitrary quantity of additional segments, metadata elements, or other items in a row that includes the ellipsis.

Figure 7A:
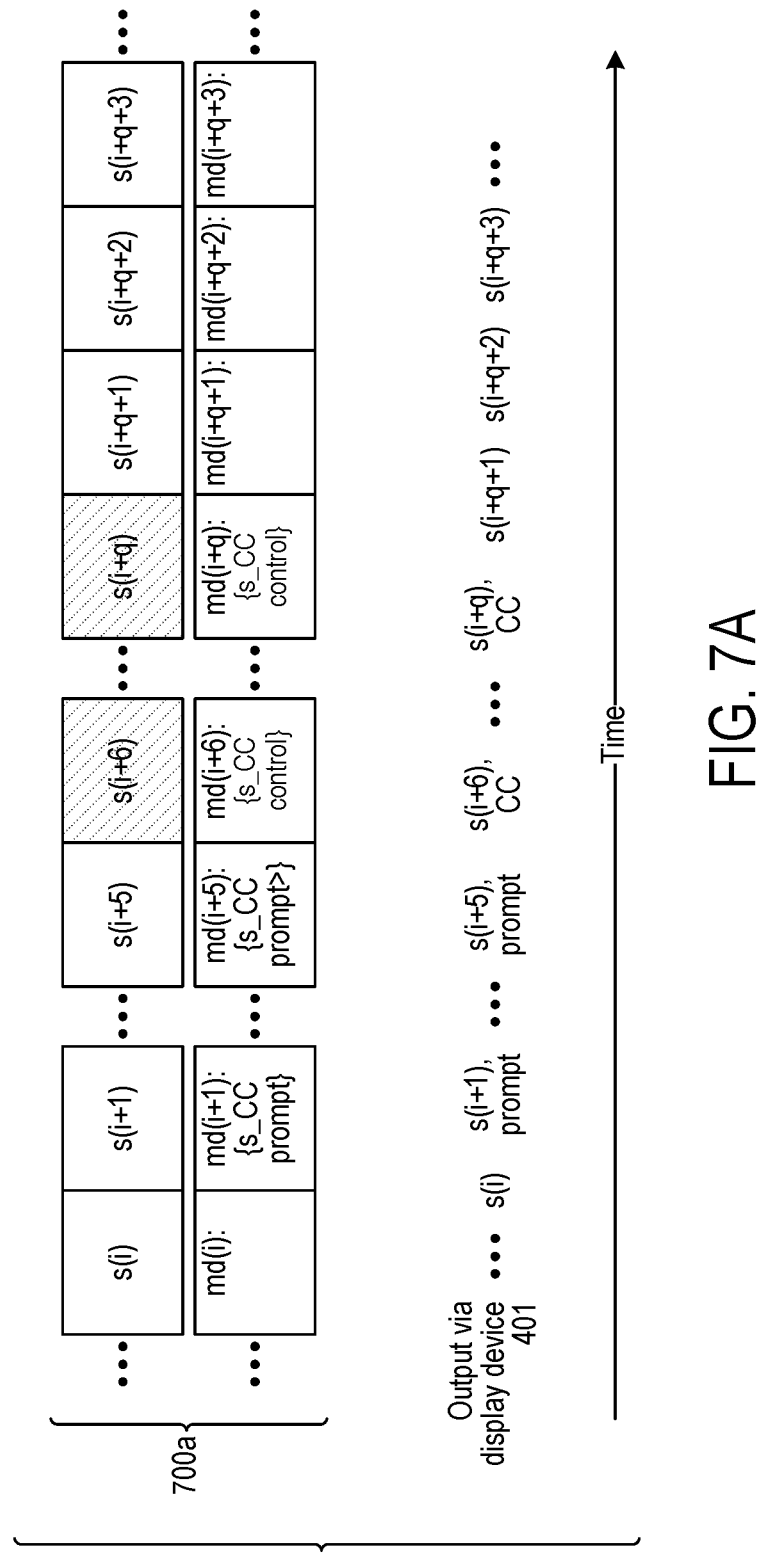
FIGS. 7A, 7B, 7C, 7D, and 7E are diagrams showing example relationships between portions of content items and modified output, via a display device, of portions of content items.

FIG. 7A is a diagram showing a relationship between a portion of a content item and output, via the display device 401, associated with modification based on selective closed captioning. A content item 700a may comprise contiguous s(i) through s(i+q+3) that correspond to contiguous metadata elements md(i) through md(i+q+3). The content item 700a may include a portion, consisting of segments s(i+6) through s(i+q) and indicated in FIG. 7A with gray cross-hatching, that the content annotation server 140 determined to be associated with selective closed captioning. The metadata elements md(i) through md(i+q+3) may comprise metadata elements that the content annotation server 140 generated and/or modified based on that determination, and that were stored in the database 141. Those metadata elements may include, for a predetermined quantity (e.g., 5 in the example of FIG. 7A) of segments s prior to segment s(i+6), metadata indicating that a portion of the content item 700a associated with selective closed captioning is upcoming and indicating that output of the predetermined quantity of segments prior to that portion may be modifiable to include a prompt. In particular, and as shown in FIG. 7A, the metadata elements md(i+1) through md(i+5) include "s_CC" to indicate a portion associated with selective closed captioning is upcoming. The metadata elements md(i+1) through md(i+5) may further include "prompt" to indicate that, depending on configuration (e.g., the selection in the interface 402), output of the segments s(i+1) through s(i+6) is modifiable to include a prompt for a user to accept output modification of the segments s(i+6) through s(i+q). The metadata elements md(i+6) through md(i+q) may include data ("s_CC control") that indicates output of corresponding segments s(i+6) through s(i+q) is modifiable to include closed captioning. For example, "s_CC control" may comprise a trigger or command that, if other conditions are met (e.g., user selecting the appropriate options in the interfaces 4A-4C and acceptance of a prompt, if the option 406 was selected), may cause the user device 302 to output closed captions with the segments s(i+6) through s(i+q).

In the example of FIG. 7A, the user of the user device 302 selected option 406 of the interface 402, option 414 of the interface 412, and one or more of options 421-424 of the interface 420. As shown in FIG. 7A, the output via the display device 401 comprises the segment s(1), followed by the segments s(i+1) through s(i+5) modified to include a prompt asking if the user would like to enable selective closed captioning. Prompts may be generated locally by the computing device 302 and superimposed on video output via the display device 401, and may indicate the type(s) of modification(s) to be made if the user accepts the option(s) associated with the prompt. Based on the user accepting selective closed captioning during the segment s(i+6), the segments s(i+6) through s(i+q) are output with closed captioning. The closed captioning output may be enabled based on the "s_CC control" command causing closed captioning to be output based on standard closed captioning data files (not shown) transmitted with the content item 700a. Based on the absence of the "s_CC control" command in the metadata elements md(i+q+1) through md(i+q+3), the segments i(i+q+1) through at least i(i+q+3) are output without closed captioning.

Figure 7B:
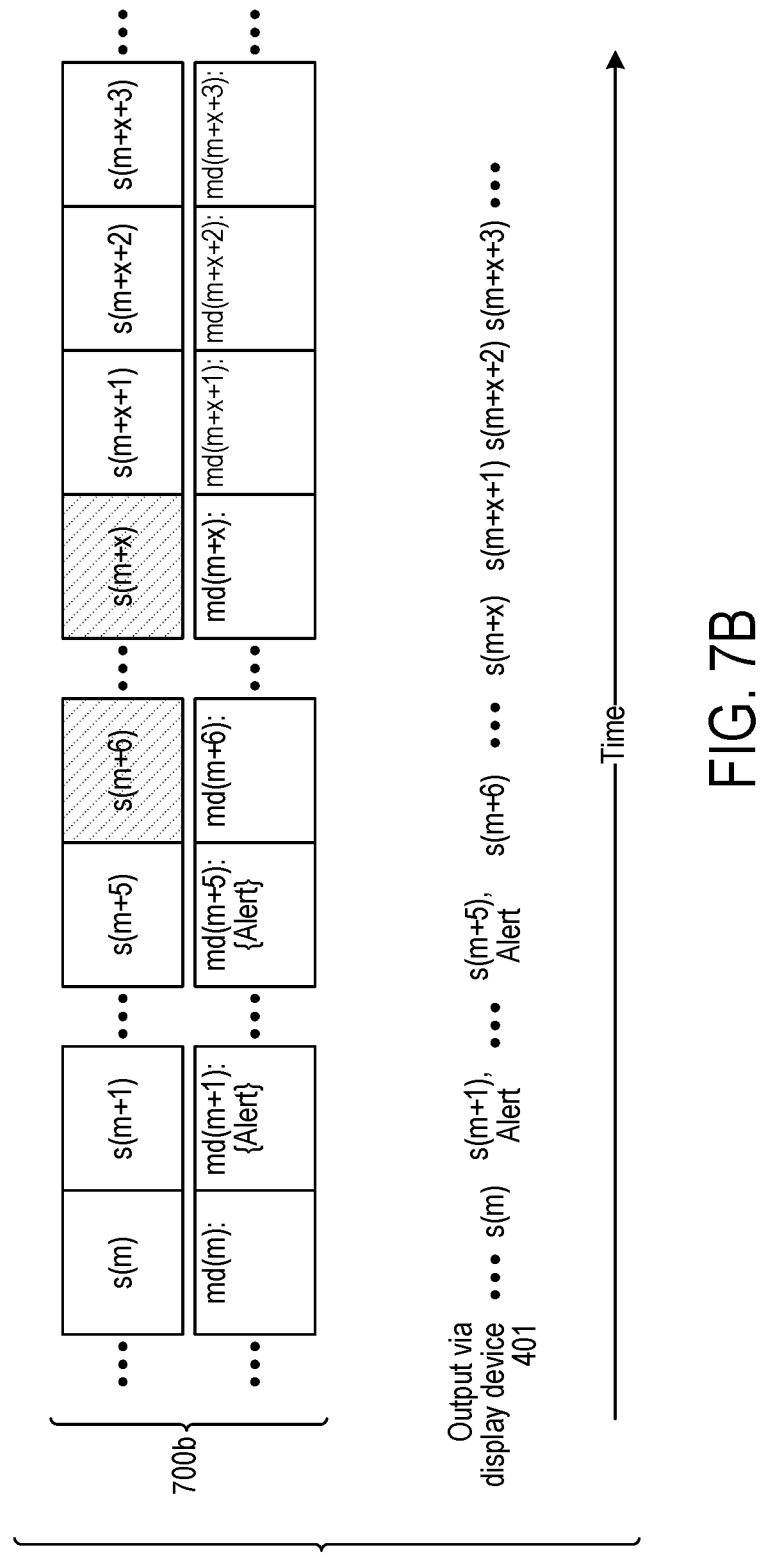

FIG. 7B is a diagram showing a relationship between a portion of a content item and modified output, via the display device 401, associated with an alert of an upcoming important portion of a content item. A content item 700b may comprise contiguous s(m) through s(m+x+3) that correspond to contiguous metadata elements md(i) through md(m+x+3). The content item 700b may include a portion, consisting of segments s(m+6) through s(m+x) and indicated in FIG. 7B with gray cross-hatching, that the content annotation server 140 determined to be an important portion of the content item 700b. The metadata elements md(m) through md(m+x+3) may comprise metadata elements that the content annotation server 140 generated and/or modified based on that determination, and that were stored in the database 141. Those metadata elements may include, for a predetermined quantity (e.g., 5 in the example of FIG. 7B) of segments s prior to segment s(m+6), data ("Alert") indicating that output of the predetermined quantity of segments is modifiable, if other conditions are satisfied, to include an alert of an upcoming important portion of the content item 700b. The other conditions may comprise selection of option 405 or option 406 in the interface 402, selection of option 431 in the interface 430, and receiving an indication that a user associated with the user device 302 is distracted.

In the example of FIG. 7B, the user of the user device 302 selected option 405 of the interface 402 and option 431 of the interface 430, and one or more indications of user distraction have been received. As shown in FIG. 7B, the output via the display device 401 comprises the segment s(1), followed by the segments s(m+1) through s(m+5) modified to include an alert of upcoming important content, followed by the segments s(m+6) through at least s(m+x+3) without an alert. Optionally, the annotation server 140 may be configured to include "Alert" in metadata elements associated with some or all segments of an important content item portion, and an alert may continue through some or all of that important portion. Alerts may be generated locally by the computing device 302 and superimposed on video output via the display device 401.

Figure 7C:
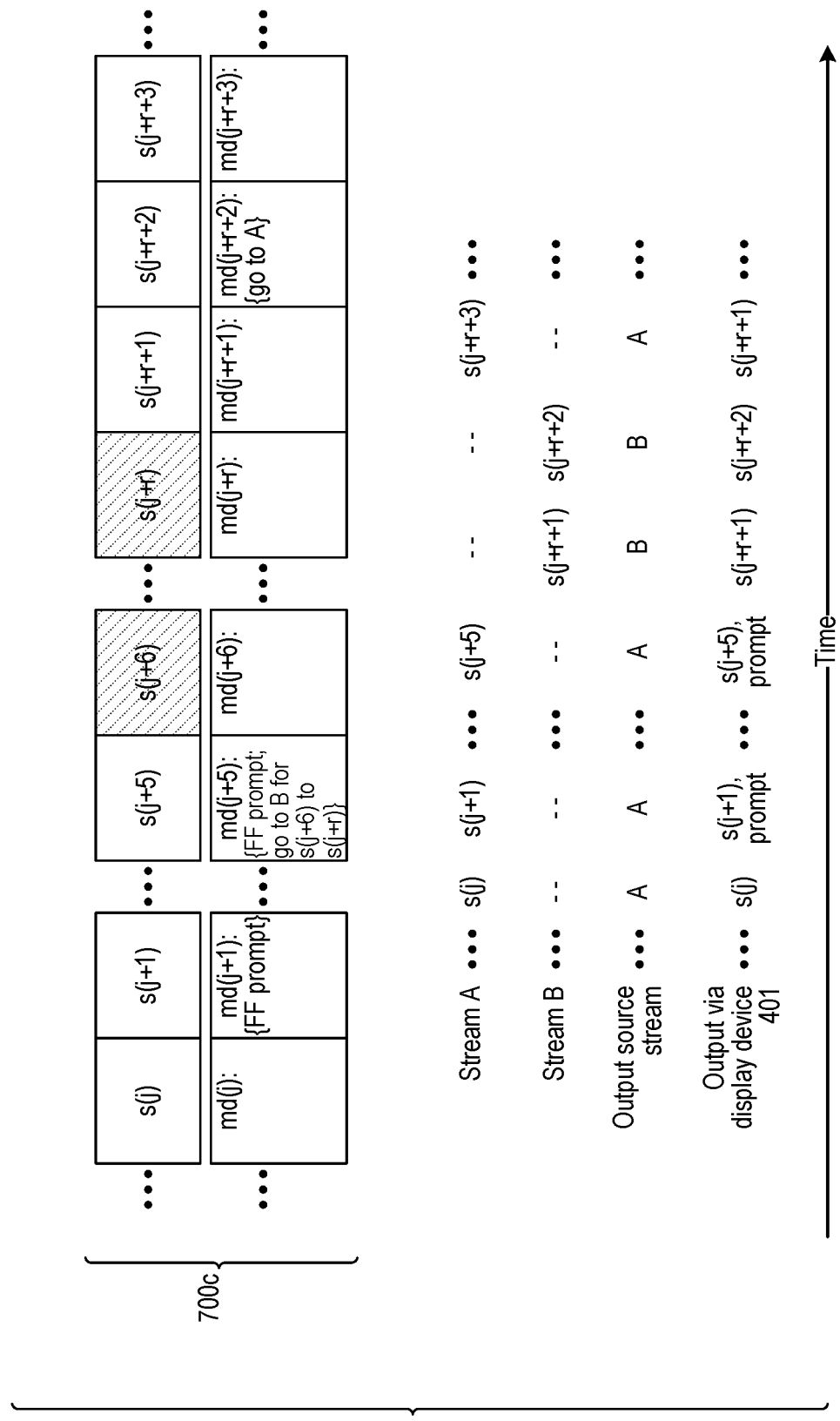

FIG. 7C is a diagram showing a relationship between a portion of a content item and modified output, via the display device 401, associated with skipping a portion of a content item, and further showing use of multiple streams. In the example of FIG. 7C, the user device 302 may be configured to receive two separate streams: an A stream and a B stream. The A stream may be used to send data associated with unmodified output of a content item 700c, and a B stream may be used to send data associated with modified output of the content item 700c. As further explained below, the content of each stream may be modifiable, based on whether options associated with prompts are accepted, so that the streams' contents facilitate switching with minimal latency observable by a user.

The content item 700c may comprise contiguous segments s(j) through s(j+r+3) that correspond to contiguous metadata elements md(j) through md(j+r+3). The content item 700c may include a portion, consisting of segments s(j+6) through s(j+r) and indicated in FIG. 7C with gray cross-hatching, that the content annotation server 140 determined to be associated with modification to skip a portion of the content item 700c. The metadata elements md(j) through md(j+r+3) may comprise metadata elements that the content annotation server 140 generated and/or modified based on that determination, and that were stored in the database 141. Those metadata elements may include, for a predetermined quantity (e.g., 5 in the example of FIG. 7C) of segments s prior to segment s(j+6), data ("FF prompt") indicating that a portion of the content item 700c associated with skipping is upcoming and indicating that output of the predetermined quantity of segments prior to that portion is modifiable to include a prompt if certain conditions are satisfied. The conditions may comprise previous selection of option 406 via the interface 402 and option 441 via the interface 440. The metadata element md(j+5) may further include a command ("go to B") indicating that the output device 302 should switch to the B stream if the user of the user device 302 accepts the skip option associated with the prompt.

In the example of FIG. 7C, the user of the device 302 selected option 406 via the interface 402 and option 441 via the interface 440. The output via the display device 401 comprises the segment s(j) without a prompt, followed by the segments s(j+1) through s(j+5) modified to include a prompt. The A stream is the source for the output of the segments s(j) through s(j+5). The B stream may contain data for the segments s(j) through s(j+5), but may alternately contain null packets or other filler data, as the metadata elements md(j) through md(j+5), as well as preceding metadata elements associated with segment preceding segment s(j), did not indicate that a switch to the B stream may occur during the segments s(j) through s(j+5). Because the metadata element md(j+5) indicates that a switch may occur with regard to the segments s(j+6) through s(j+r), however, the content of the B stream is configured so that the B stream includes at least segments s(j+r+1) and s(j+r+2) at a time when those segments may be needed in response to user acceptance of the skip option.

In the example of FIG. 7C, the user of the user device 302 accepts the skip option associated with the prompt during output of the segment s(j+5). The B stream becomes the output source stream, and segment s(j+r+1) is output after output of segment s(j+5), thereby skipping output of segments s(j+6) through s(j+r). After segment s(j+r+1), segment s(j+r+2) is output using data from the B stream. During output of the segments s(j+r+1) and s(j+r+2) based on data from the B stream, the A stream may be reconfigured so that segment s(j+r+3) is available immediately following output of the segment s(j+r+2). Although not shown, the user device 302 may send a message to another computing device (e.g., the output modification server 142) indicating that the skip option was accepted, thereby informing the other computing device that modification of the A stream may be needed. Based on a command ("go to A") in the metadata element md(j+r+2), stream A becomes the active stream and segment s(j+r+3) and subsequent streams are output based on data from stream A. Stream B may be reconfigured to prepare for the next possible switch to stream B indicated by a subsequent metadata element md. The quantity of segments output based on the B stream prior to switching back to the A stream may be varied (e.g., to provide additional time to reconfigure the A stream).

Figure 7D:
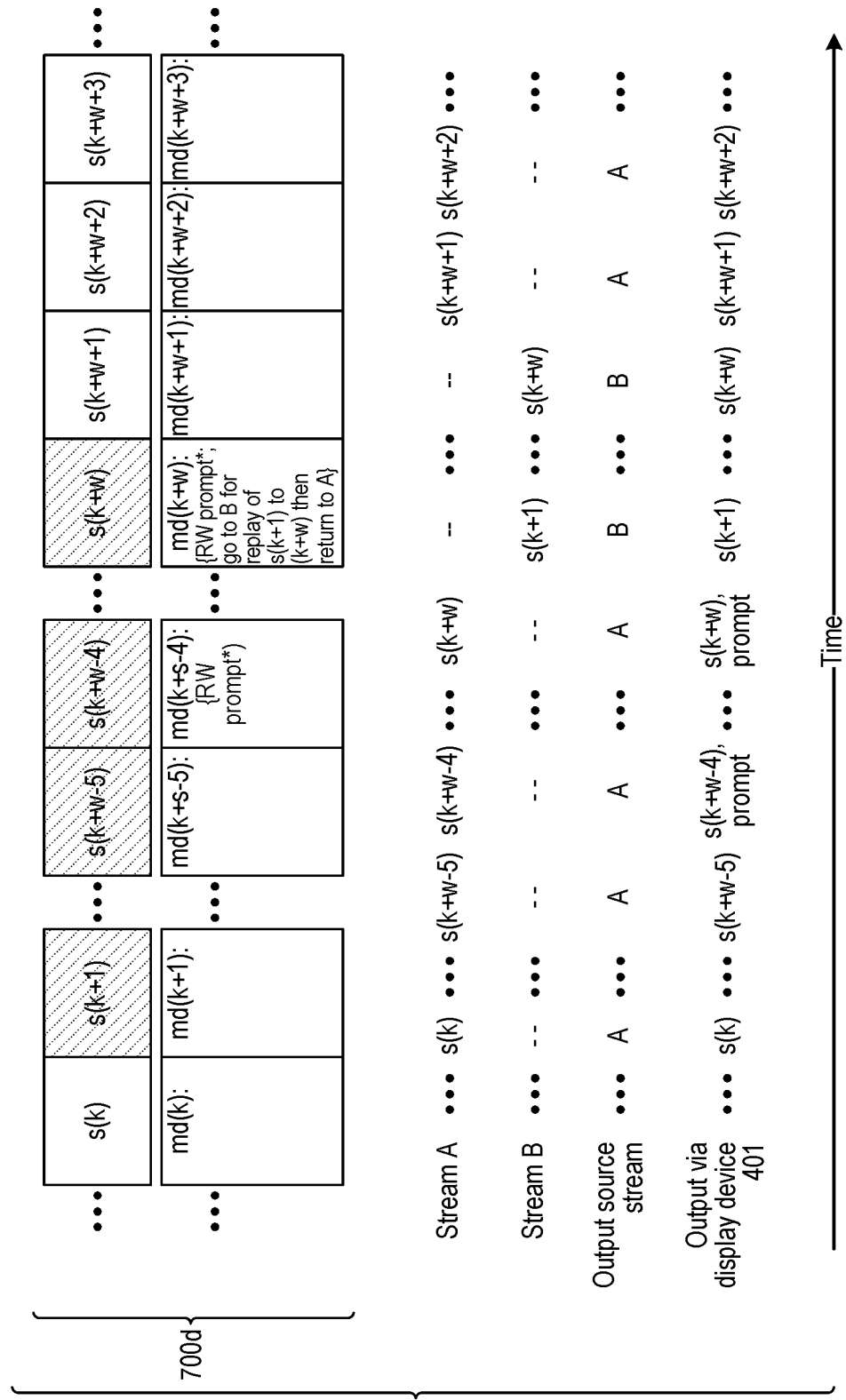

FIG. 7D is a diagram showing a relationship between a portion of a content item and modified output, via the display device 401, associated with replay of a portion of a content item, and further showing use of multiple streams. In the example of FIG. 7D, the user device 302 may be configured to receive the A stream and the B stream. The A stream may be used to send data associated with unmodified output of a content item 700d, and the B stream may be used to send data associated with modified output of the content item 700d. The content of each stream may be modifiable based on whether options associated with prompts are accepted.

The content item 700d may comprise contiguous segments s(k) through s(k+w+3) that correspond to contiguous metadata elements md(k) through md(k+w+3). The content item 700d may include a portion, consisting of segments s(k+1) through s(k+w) and indicated in FIG. 7D with gray cross-hatching, that the content annotation server 140 determined to be associated with modification to replay a portion of the content item 700d. The metadata elements md(k) through md(k+w+3) may comprise metadata elements that the content annotation server 140 generated and/or modified based on that determination, and that were stored in the database 141. Those metadata elements may include, for the segment s(k+w) and a predetermined quantity (e.g., 4 in the example of FIG. 7D) of segments s prior to the segment s(k+w), data ("RW prompt*") indicating that an end of a portion of the content item 700d associated with replay is upcoming and indicating that an initial output of the predetermined quantity of segments prior to the end of that portion may be modifiable to include a prompt if certain conditions are satisfied, but that the prompt may be omitted for subsequent output of those segments if the replay option is accepted. The conditions may comprise previous selection of option 406 via the interface 402 and option 442 via the interface 440. The metadata element md(k+w) may further include a command ("go to B for replay of s(k+1) to s(k+w)") indicating that the output device 302 should switch to the B stream if the user of the user device 302 accepts the replay option associated with the prompt.

In the example of FIG. 7D, the user of the device 302 selected option 406 via the interface 402 and option 442 via the interface 440. The output via the display device 401 comprises the segments s(k) through s(k+5−w) without a prompt, followed by the segments s(k+w−4) through s(k+w) modified to include a prompt. The A stream is the source for the output of the segment s(k) and for the initial output of the segments s(k+1) through s(k+w). Prior to acceptance of the prompt, the B stream may contain data for the segments s(k+1) through s(k+w), but may alternately contain null packets or other filler data. Because the metadata element md(k+5) indicates that a switch may occur with regard to replay of the segments s(k+1) through s(k+w), however, the content of the B stream may be configured so that the B stream includes segments s(k+1) through s(k+w) at a time when those segments may be needed in response to user acceptance of the replay option.

In the example of FIG. 7D, the user of the user device 302 accepts the replay option associated with the prompt during initial output of the segment s(k+w). The B stream becomes the output source stream, and segments s(k+1) through s(k+w) are again output after the initial output of the segment s(k+w). After the segments s(k+1) through s(k+w) are output the second time using data from the B stream, and based on another command in the metadata element md(k+w) ("then return to A"), the user device switches to the A stream. During output of the segments s(k+1) through s(k+w) based on data from the B stream, the A stream may be reconfigured so that segment s(k+w+1) is available immediately following the second output of the segment s(k+w). Although not shown, the user device 302 may send a message to another computing device (e.g., the output modification server 142) indicating that the reply option was accepted, thereby informing the other computing that modification of the A stream may be needed. The B stream may be reconfigured to prepare for the next possible switch to stream B indicated by a subsequent metadata element md.

Figure 7E:
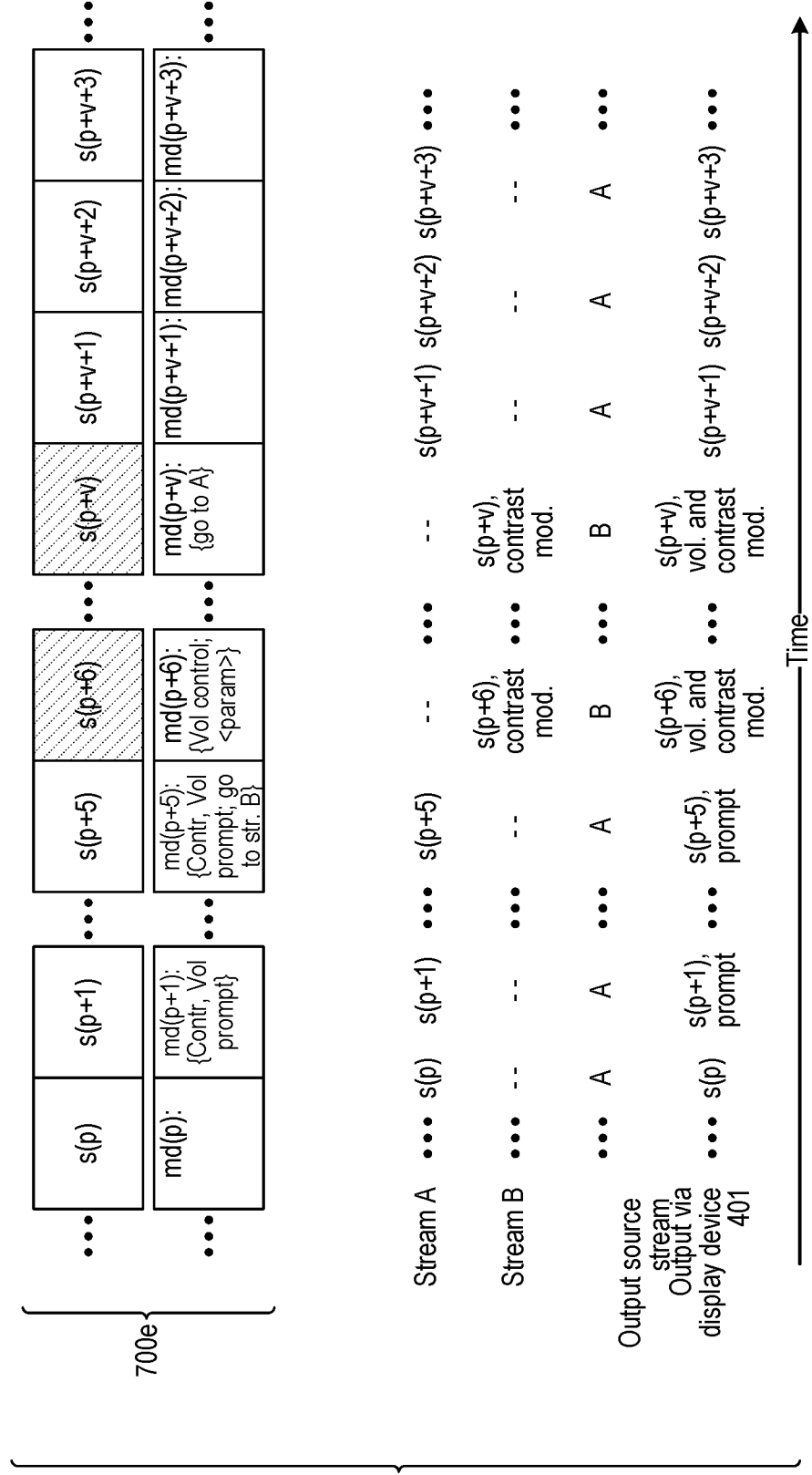

FIG. 7E is a diagram showing a relationship between a portion of a content item and modified output, via the display device 401, associated adjusting audio volume and video contrast, and further showing use of multiple streams. In the example of FIG. 7E, the user device 302 may be configured to receive the A stream, which may be used to send data associated with unmodified output of a content item 700e, and the B stream, which may be used to send data associated with modified output of the content item 700c.

The content item 700e may comprise contiguous segments s(p) through s(p+v+3) that correspond to contiguous metadata elements md(p) through md(p+v+3). The content item 700c may include a portion, consisting of segments s(p+6) through s(p+v) and indicated in FIG. 7E with gray cross-hatching, that the content annotation server 140 determined to be associated with modification to adjust audio volume and adjust video contrast. The metadata elements md(p) through md(p+v+3) may comprise metadata elements that the content annotation server 140 generated and/or modified based on that determination, and that were stored in the database 141. Those metadata elements may include, for a predetermined quantity (e.g., 5 in the example of FIG. 7E) of segments s prior to segment s(p+6), data ("Contr, Vol prompt") indicating that a portion of the content item 700e associated with volume and contrast adjustment is upcoming and indicating that output of the predetermined quantity of segments prior to that portion is modifiable to include a prompt if certain conditions are satisfied. The conditions may comprise previous selection of option 406 via the interface 402 and options 443 and 444 via the interface 440. The metadata element md(p+5) may further include a command ("go to B") indicating that the output device 302 should switch to the B stream if the user of the user device 302 accepts the option associated with the prompt. In the example of FIG. 7E, volume adjustment may be performed by issuing a command (e.g., via a Consumer Electronics Control (CEC) pin of a High-Definition Multimedia Interface (HDMI) coupling the user device 302 to the display device 401) that causes a volume change in audio output via one or more speakers associated with the display device 401. Contrast adjustment may be performed by outputting versions of segments that were generated by transcoding to increase contrast.

In the example of FIG. 7E, the user of the device 302 selected option 406 via the interface 402 and options 443 and 444 via the interface 440. The output via the display device 401 comprises the segment s(p) without a prompt, followed by the segments s(p+1) through s(p+5) modified to include a prompt. The A stream is the source for the output of the segments s(p) through s(p+5). The B stream may contain data for the segments s(p) through s(p+5), but may alternately contain null packets or other filler data. Because the metadata element md(p+5) indicates that a switch may occur with regard to the segments s(p+6) through s(p+v), however, the content of the B stream is configured so that the B stream includes at least segment s(p+6) at a time when that segment may be needed in response to user acceptance of the option.

In the example of FIG. 7E, the user of the user device 302 accepts the option associated with the prompt during output of the segment s(p+5). The B stream becomes the output source stream, and segments s(p+6) through s(p+v) are output using data from the B stream. A command ("Vol control; <param>") in the metadata element md(p+6) may cause the user device 302 to instruct the display device 401 to adjust volume based on a value indicated (e.g., by "<param>") in the command. During output of the segments s(p+6) through s(p+v) based on data from the B stream, the A stream may be reconfigured so that segment s(p+v+1) is available immediately following output of the segment s(p+v). Although not shown, the user device 302 may send a message to another computing device (e.g., the output modification server 142) indicating that the contrast modification option was accepted, thereby informing the other computing device that modification of the A stream may be needed. Based on a command ("go to A") in the metadata element md(p+v), stream A becomes the active stream and segment s(p+v+1) and subsequent segments are output based on data from stream A. Stream B may be reconfigured to prepare for the next possible switch to stream B indicated by a subsequent metadata element md.

In the example of FIG. 7E, the output modification option combined modification to adjust volume and modification to adjust contrast. Such modifications need not occur in combination, and or other modifications may be combined.

Audio issues in a content item may be addressed by adjusting output device volume and/or by enabling closed captioning. One or more of the user interfaces of FIGS. 4A-4E may be modified, and/or one or more user interfaces added, to provide users with a way to provide input indicating the type(s) of audio issues for which closed captioning may be preferred and/or indicating the types of audio issues for which volume modification may be preferred. As but one examples of such preferences, a user may provide input indicating that closed captioning is preferred for portions of content items in which a speaker has an accent or in which certain specified persons are speaking, that volume adjustment is preferred for portions of content items that other viewers have found hard to hear or understand, and that both closed captioning and volume adjustment are preferred for portions of content items in which overall volume is low or in which volume of background sounds is high. When processing a content item to determine portions to be associated with possible output modification, the content annotation server 140 may generate and/or modify metadata to include indications of the types of audio issues warranting modification, and/or to control the type(s) of modifications to be made based on user preferences.

Metadata corresponding to content segments of a content item may comprise data associated with multiple types of output modifications, but some or all of that metadata may be inapplicable and/or unused in connection with output of the content item to one or more users. For example, a first user may have provided input (e.g., via one or more interfaces such as those in FIGS. 4A-4E) indicating that a first of multiple modifications indicated by a metadata element is desired, but that a second of those multiple modifications is not desired. A second user may have provided input indicating that the first modification is not desired, but that the second modification is desired. A third user may have provided input indicating that neither the first modification nor the second modification is desired.

In some of the examples of FIGS. 7A-7E, metadata elements included data indicating that some actions may be taken during an initial outputting of a segment, and that different (or no) actions may be taken during a subsequent outputting of the segment. Also or alternatively, additional metadata with may be provided to the user device 302 (e.g., via the B stream) with segment data for subsequent outputting of a segment, which additional metadata may include instructions associated with subsequent outputting of the segment and/or may omit instructions not associated with the subsequent outputting of the segment.

FIGS. 8A-8J are a flow chart showing steps of an example method associated with annotating content for selective output modification and further associated with causing selectively modified output. For convenience, the example method of FIGS. 8A-8J is explained below using an example in which some steps may be performed by the content annotation server 140, some steps may be performed by the output modification server 142, and some steps may be performed by the user device 302. However, all steps of the example method may be performed by the content annotation server 140. Alternatively, all steps of the example method may be performed by the output modification server 142, by the user device 302, or by another computing device. Moreover, steps of the example method may be allocated to the servers 140 and 142, to the user device 302, and/or to other computing devices, in ways other than as described below. One or more steps of the example method may be rearranged (e.g., performed in a different order), omitted, and/or otherwise modified, and/or other steps added.

In step 801, the content annotation server 140 may receive data for a content item. The received data may comprise segment data for the content item. The received data may also include existing metadata, which existing metadata may be modified by the content annotation server 140 in subsequent steps. Also or alternatively, content annotation server 140 may generate new metadata for the content item in subsequent steps. In step 804, the content annotation server 140 may receive data associated with user inputs during previous outputtings of the content item. The received data may, for example, comprise data similar to that described for the user devices 301 of FIG. 3.

In step 805, the content annotation server 140 may determine, based on the data received in step 804, segments of the content item to be associated with selective closed captioning, and may generate and/or modify metadata for those segments. Additional details of step 805 are described below in connection with FIG. 8E. In step 806, the content annotation server 140 may determine segments of the content item to be associated with selective replay, and may generate and/or modify metadata for those segments. Additional details of step 806 are described below in connection with FIG. 8F. In step 807, the content annotation server 140 may determine segments of the content item to be associated with alerting of upcoming important portions, and may generate and/or modify metadata for those segments. Additional details of step 807 are described below in connection with FIG. 8G. In step 808, the content annotation server 140 may determine segments of the content item to be associated with skipping portions of the content item, and may generate and/or modify metadata for those segments. Additional details of step 808 are described below in connection with FIG. 8H. In step 809, the content annotation server 140 may determine segments of the content item to be associated with volume adjustment, and may generate and/or modify metadata for those segments. Additional details of step 809 are described below in connection with FIG. 8I. In step 810, the content annotation server 140 may determine segments of the content item to be associated with contrast adjustment, and may generate and/or modify metadata for those segments. Additional details of step 810 are described below in connection with FIG. 8J.

In step 817, the content annotation server 140 may determine if more data, associated with user inputs during outputtings of the content item, or if other data (e.g., such as is described in connection with FIGS. 8E-8J) that may be used to determine if output modification is appropriate, has been received. If yes, steps 805 through 810 may be repeated (e.g., to update any determinations and metadata from previous iterations of those steps). If no, step 818 may be performed. In step 818, the output modification server 142 may determine if a request for output of the content item has been received (e.g., if a request from the user device 302 of FIG. 3 has been received). If no, step 817 may be repeated by the content annotation server. If yes, the output modification server 142 may perform step 825 (FIG. 8B). In the current example, it is assumed that a request for the content item is received from the user device 302.

In step 825 (FIG. 8B), the output modification server 142 may determine preferences, associated with the user device 302, for selective output modification. The preferences may, for example, be based on user input provided via interfaces such as the interfaces 402, 412, 420, 430, and 440. The user inputs may be provided in connection with requesting the content item. Also or alternatively, the user inputs may have been provided in another context (e.g., in connection with creating a user profile) and stored data from those inputs forwarded as part of step 825. In step 827, the output modification server 142 may determine, based on the preferences determined in step 825, an output modification mode. If the user prefers no selective output modification (e.g., if option 407 of the interface 402 was selected), the output modification server 142 may in step 826 cause (e.g., by sending an instruction to the user device to ignore metadata associated with selective output modification) the content item to be output without selective modification, after which step 817 may be performed. If the user prefers automated output modification (e.g., if option 405 of the interface 402 was selected) or prompting to accept output modifications (e.g., if option 406 of the interface 402 was selected), step 830 may be performed.

In step 830, the output modification server 142 may determine, based on the preferences from step 825, segment data to send via the B stream at various times during output of the content item. The segment data may include segments for portions to be replayed, segments for portions transcoded to adjust contrast, and/or other segments that may be used to modify output of a portion of the content item. The timing of when to send the segments determined in step 830 may be determined during output of the content item (e.g., based on whether the user accepts one or more options to modify output by skipping or replaying). In step 832, output modification server 142 may send one or more instructions to the user device 302. The instructions may include an instruction to initially make the A stream active (e.g., to initially use segment data from the A stream for output of the content item). The instructions may also include instructions, based on the preferences from step 825, to ignore certain instructions in metadata for the content item and to execute other instructions in the metadata for the content item. As part of step 832, the content output modification server 142 may cause sending, to the user device 302, of segments and metadata elements for the content item to begin and to continue until completed or until interrupted by the user.

In step 833, the user device 302 may go to the next segment of the content item and its corresponding metadata and may treat that segment and its corresponding metadata as the current segment and metadata. In the initial performance of step 833, the user device may treat the first segment and corresponding metadata as the next/current segment and metadata. In step 836, the user device 302 may determine if the current metadata indicates an alert for an upcoming important portion of the content item. If no, the user device may in step 837 clear a dismiss flag if that flag has been set (e.g., in connection with a previous segment). As explained below, the dismiss flag may be set if a user dismisses an alert that has been output. As part of step 837, the user device may also clear an alert flag if the alert flag has been set (e.g., in connection with a previous segment). As also explained below, the alert flag may be set if the current metadata indicates an alert. After step 837, step 849 may be performed. If the user device 302 determines in step 836 that the current metadata indicates an alert, step 838 may be performed.

In step 838, the user device 302 may determine if the dismiss flag is set. If yes, step 849 may be performed. If no, step 839 may be performed. In step 839, the user device 302 may determine if one or more indications of distraction have been received for one or more users associated with the user device 302. An indication of distraction may comprise data indicating that an image from one or more cameras associated with the user device 302 show a user looking away from the display device 401. Also or alternatively, an indication of distraction may comprise data indicating that computing devices other than the user device 302 are in proximity to the user device 302 and are receiving different content. Also or alternatively, an indication of distraction may comprise data indicating, based on sounds detected by one or microphones, that users in proximity to the user device 302 are engaged in conversation. Other types of indications of distraction may also or alternatively be received. If an indication of distraction has not been received, step 849 may be performed. If an indication of distraction has been received, the user device 302 may set the alert flag in step 840.

After step 840, the user device 302 may in step 843 determine if an alert has been dismissed. For example, after output of a segment modified to include an alert, a user may provide an input (e.g., via a remote control device associated with the user device 302) that dismisses or cancels the alert. A user may do so, for example, after noticing an alert and to avoid having the alert continue. If the user device 302 determines in step 843 that an alert has been dismissed, the user device 302 may in step 844 set the dismiss flag and clear the alert flag. After a no determination in step 843, or after performing step 844, the user device 302 may perform step 849.

In step 849 (FIG. 8C), the user device 302 may determine, based on the same data determined by the output modification server 142 in step 825, the output modification mode for the user device 302. If automated output modification has been selected (e.g., option 405 of the interface 402), the user device 302 may perform step 873. Step 873 is described below. If prompting for acceptance of output modification options has been selected (e.g., option 406 of the interface 402), the user device 302 may perform step 850. In step 850, the user device may determine if a prompt or modification is indicated in the current metadata. If no, step 864 may be performed. Step 864 is described below. If yes, step 851 may be performed. In step 851, the user device 302 may determine if a prompt is indicated in the current metadata. If no, step 864 may be performed. If yes, the user device 302 may in step 852 set a prompt flag. After step 852, the user device 302 may in step 853 determine if an accept flag has been set. An accept flag may be set, as described below, if a user provides input indicating that the user has accepted the output modification option(s) associated with an outputted prompt. A user may, for example, provide such an indication by pressing, during output of the prompt, an "ok" on a remote control associated with the user device 302.

If the user device 302 determines in step 853 that the accept flag is set, the user device 302 may in step 854 clear the prompt flag. After step 854, the user device 302 may in step 857 determine if the current metadata includes a control instruction (e.g., an instruction to enable closed captioning, and instruction to adjust volume). If yes, the user device 302 may in step 858 set an active control flag. After step 858, or after a no determination in step 857, the user device 302 may perform step 864.

Returning briefly to step 853, if the user device 302 determines in step 853 that the accept flag is not set, the user device 302 may in step 860 determine if a user has provided an indication of accepting output modification option(s) associated with an outputted prompt. If no, step 864 may be performed. If yes, the user device 302 may in step 861 set the accept flag and clear the prompt flag. After step 861, the user device 302 may perform step 857.

In step 864, the user device 302 may output the current segment based on the status of the alert flag, the status of the prompt flag, and the status of the active control flag. If the alert flag is set, the user device 302 may output the current segment with an alert. If the prompt flag is set, the user device 302 may output the current segment with a prompt for acceptance of one or more output modification options indicated by the current metadata. If the active control flag is set, the user device 302 may output the current segment with modifications indicated by one or more control commands in the current metadata.

After step 864, the user device 302 may clear the prompt flag (if set), may clear the alert flag (if set), and may clear the active control flag (if set). After step 865, the user device 302 may in step 866 determine if the current metadata includes an instruction to switch streams. If no, step 868 may be performed. If yes, the user device 302 may in step 867 switch to the other stream. After step 867, the user device 302 may perform step 868. In step 868, the user device 302 may determine if there are more segments of the content item. If no step 817 (FIG. 8A) may be performed. If yes, step 833 (FIG. 8B) may be performed.

If the user device 302 determines in step 849 that automated output modification has been selected, and as indicated above, step 873 may be performed. In step 873 (FIG. 8D), the user device 302 may determine if the current metadata includes a control instruction. Step 873 may be similar to step 857. If the user device 302 determines in step 873 that the current metadata includes a control instruction, the user device 302 may in step 874 set the active control flag. After step 874, or after a no determination in step 873, the user device 302 may in step 875 output the current segment based on the current statuses of the alert and active control flags. After step 875, the user device 302 may in step 876 clear the alert flag (if set) and may clear the active control flag (if set). After step 876, the user device 302 may in step 879 determine if the current metadata includes an instruction to switch streams. Step 879 may be similar to step 866. Based on a yes determination in step 879, the user device 302 may in step 880 switch to the other stream. After step 880, or after a no determination in step 879, the user device 302 may perform step 881, which may be similar to step 868. If the user device 302 device determines in step 881 that there are no more segments for the content item, step 817 (FIG. 8A) may be performed. If the user device 302 determines in step 881 that there are more segments for the content item, step 833 (FIG. 8B) may be performed.

Figure 8A:
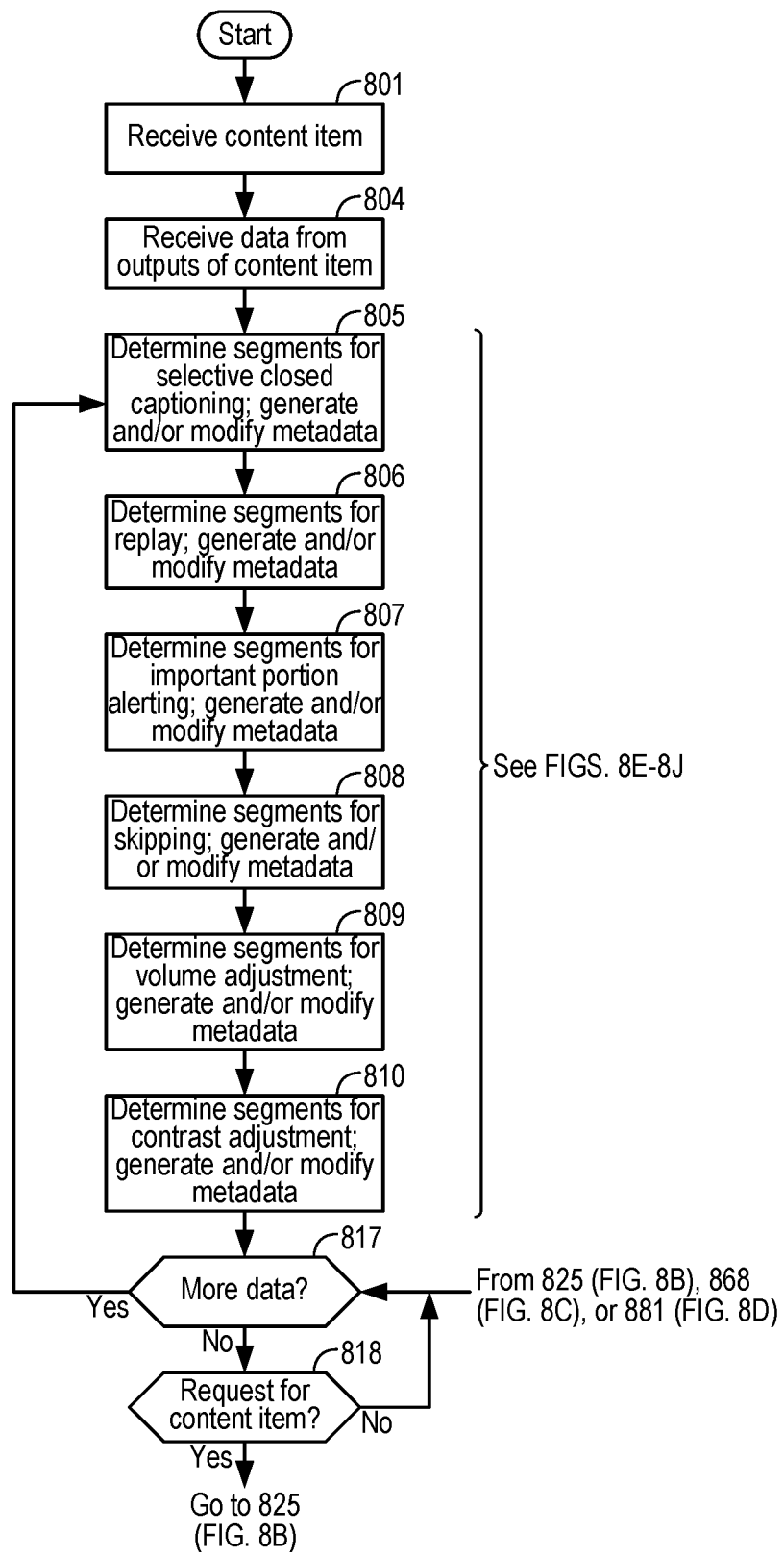
FIGS. 8A, 8B, 8C, 8D, 8E, 8F, 8G, 8H, 8I, and 8J are a flow chart showing steps of an example method associated with annotating content for selective output modification and with causing selectively modified output.
Figure 8B:
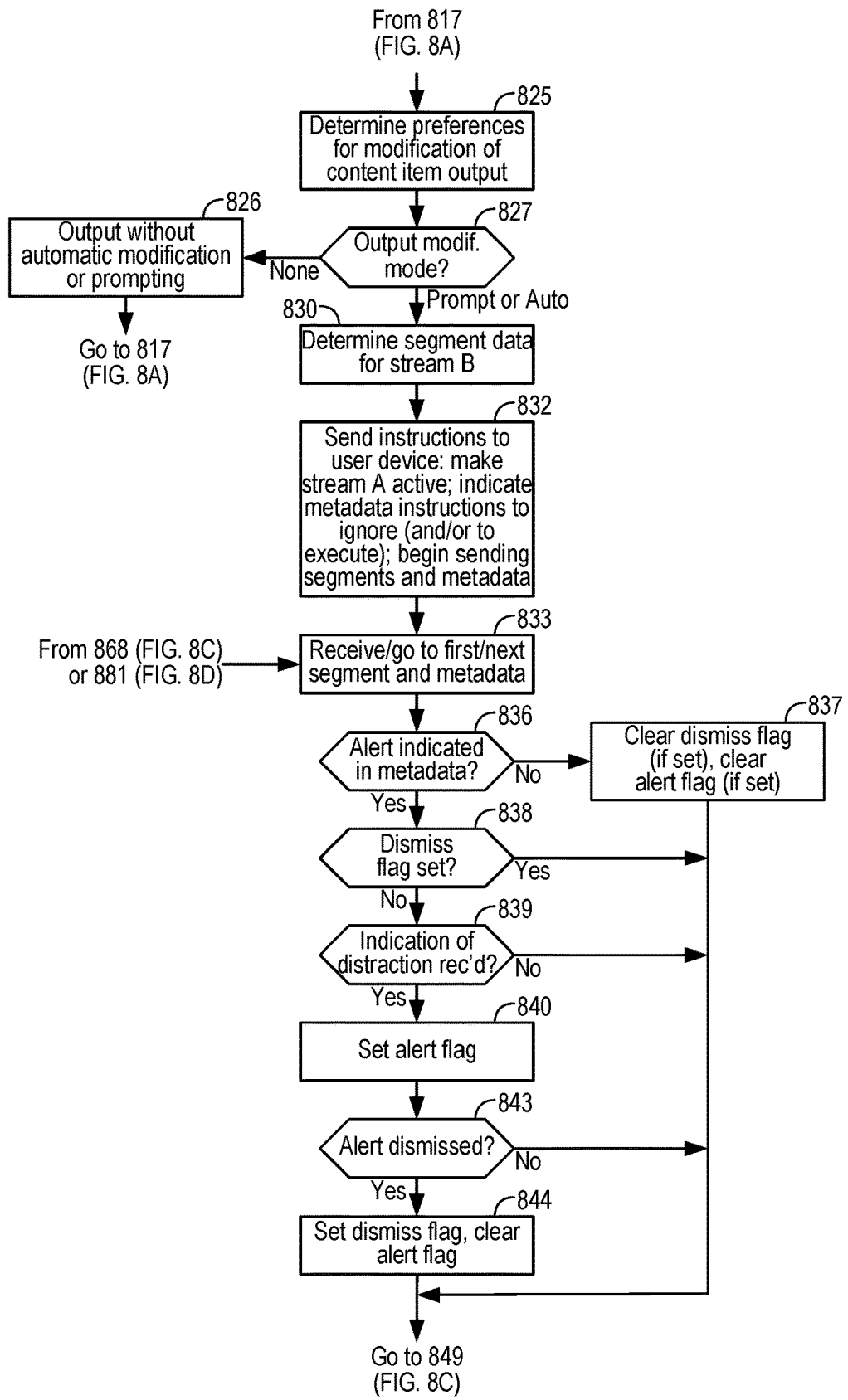
Figure 8C:
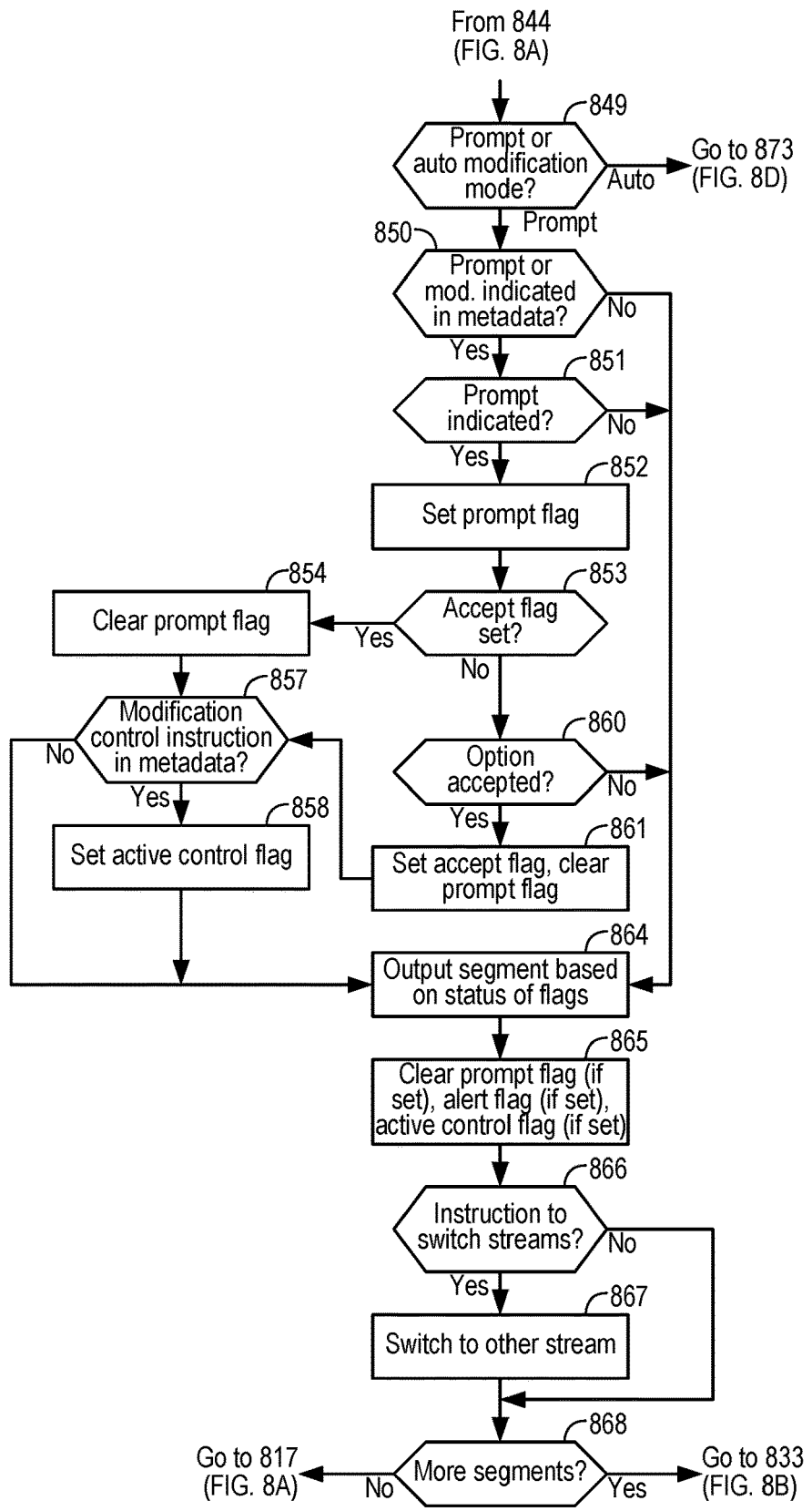
Figure 8D:
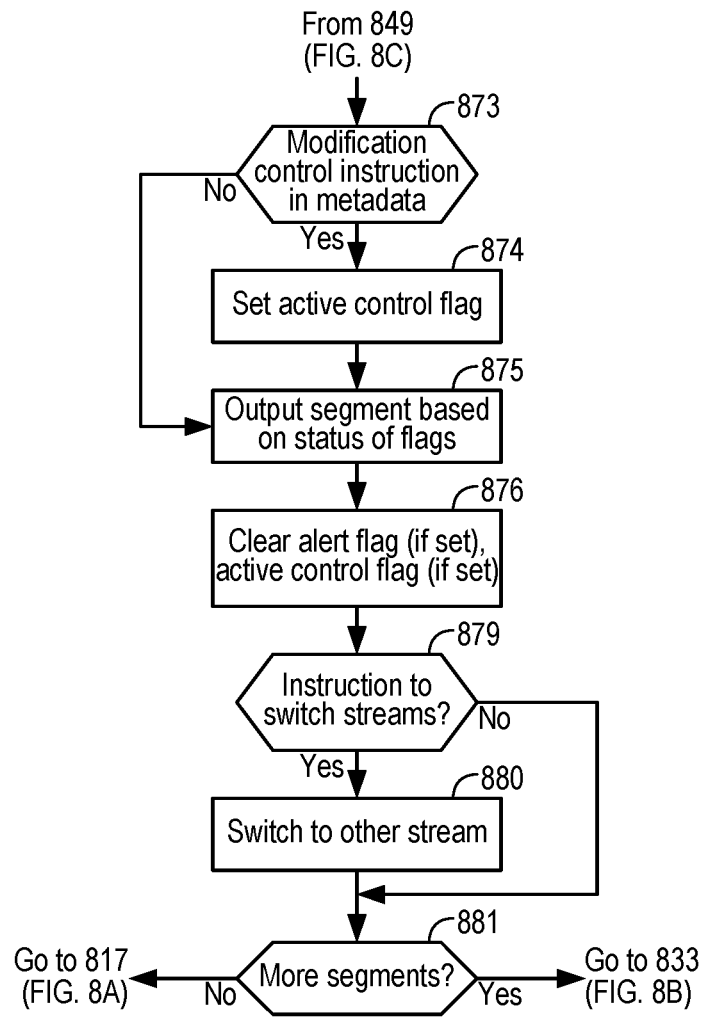
Figure 8E:
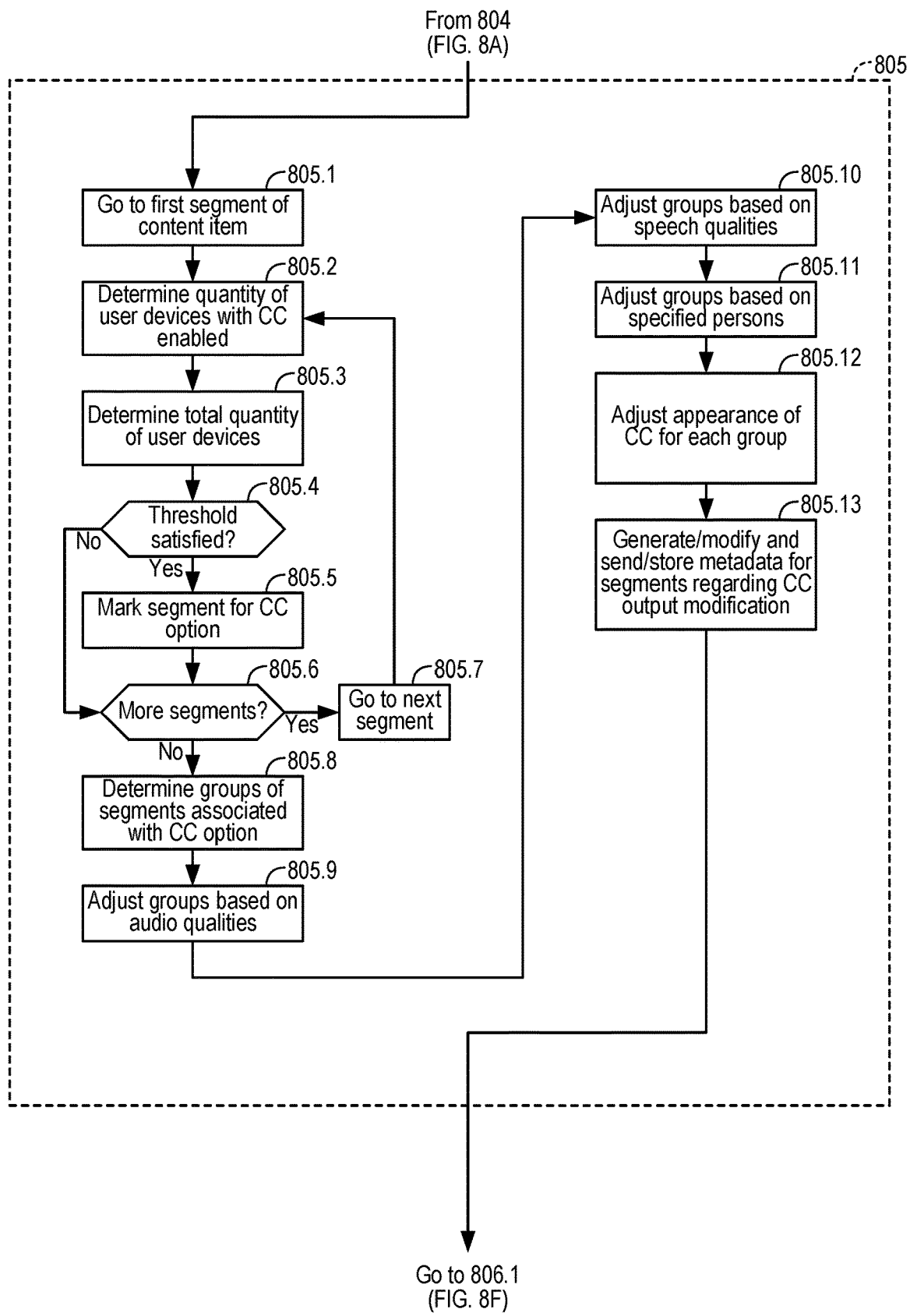

FIG. 8E shows additional details of step 805 of FIG. 8A. In step 805.1, the content annotation server 140 may go to a first segment of the content item and set the first segment as the current segment. In step 805.2, the content annotation server 140 may determine a quantity of user devices, of all the user devices via which the current segment was output, for which closed captioning was enabled. In step 805.3, the content annotation server 140 may determine the total quantity of user devices via which the current segment was output. In step 805.4, the output annotation server 140 may determine whether a quantity threshold is satisfied by the quantity of user devices for which closed captioning was enabled for the current segment. The quantity threshold may comprise a percentage (e.g., 50%), and the quantity threshold may be satisfied if the quantity of user devices for which closed captioning was enabled for the current segment, divided by the total quantity of user devices via which the current segment was output, equals or exceeds the threshold percentage. Other percentages may be used for the quantity threshold (e.g., 55%, 60%, 70%, 75%, 80%, 85%).

If the content annotation server 140 determines in step 805.4 that the quantity threshold is satisfied, the current segment may in step 805.5 be marked for inclusion in a group of segments for a portion of the content item to be associated with selective closed captioning. After step 805.5, or after a no determination in step 805.4, the content annotation server 140 may in step 805.6 determine if there are more segments in the content item. If yes, the content annotation server 140 may in step 805.7 go to the next segment and make the next segment the current segment. After step 805.7, the content annotation server 140 may perform step 805.2. If the determination of step 805.6 is no, the content annotation server 140 may in step 805.8 determine, based on the segments marked in step 805.5, groups of those segments that represent portions of the content item to be associated with selective closed captioning. In step 805.9, the content annotation server 140 may adjust those groups based on audio qualities of the audio for the content item. For example, using one or more audio analysis software programs, the content annotation server 140 may determine portions of the audio for which overall volume is below a predetermined threshold and/or portions of the audio for which a volume of non-speech background sounds is higher than a predetermined percentage of a volume for speech sounds. The adjusting of step 805.9 (and of subsequent steps) may comprise modifying an existing group to include one or more additional segments, and/or determining a new group.

In step 805.10, the content annotation server 140 may adjust the groups of steps 805.8 and 805.9 based on speech qualities in audio of the content item. For example, speech recognition software may be used to create one or more transcripts, and portions of the transcript showing accented speech (and/or which indicate speech could not be recognized) could be used to identify additional segments of the content item to associated with selective closed captioning. In step 805.11, the content annotation server 140 may adjust the groups of steps 805.8-805.10 based on specified persons speaking in segments of the content item. The content annotation server 140 may, for example, determine persons speaking in segments based on transcripts and/or other data (e.g., data received from a content provider).

In step 805.12, the content annotation server 140 may determine if visual characteristics of closed captioning, associated with groups determined in steps 805.8-805.11, should be adjusted to improve visibility of the closed captioning and/or to reduce obscuring of important parts of video frames. The determination of step 805.12 may be performed using one or more video analysis programs to determine light and/or dark regions of frames (e.g., to determine darker or lighter text should be used) and/or to determine regions of series of frames with high activity (e.g., to determine regions where placement of text may be less desirable). If the content annotation server 140 determines that adjustments to the closed captioning for a portion of a content item (e.g., for a group determined in steps 805.8-805.11), segments for an alternate version of that portion may be generated and stored, and may be provided to a user device via a separate stream.

In step 805.13, the content annotation server 140 may, based on the determinations of steps 805.8-805.12, generate metadata (and/or modify existing metadata) for segments of the content item associated with selective closed captioning. The metadata may, for example, include metadata such as was described for metadata elements md(i+1) through md(i+q) of FIG. 7A. As part of step 805.13, the content annotation server 140 may cause that generated/modified metadata, together with any segments generated for alternate versions of content item portions, to be stored in the selective output modification database 142.

Figure 8F:
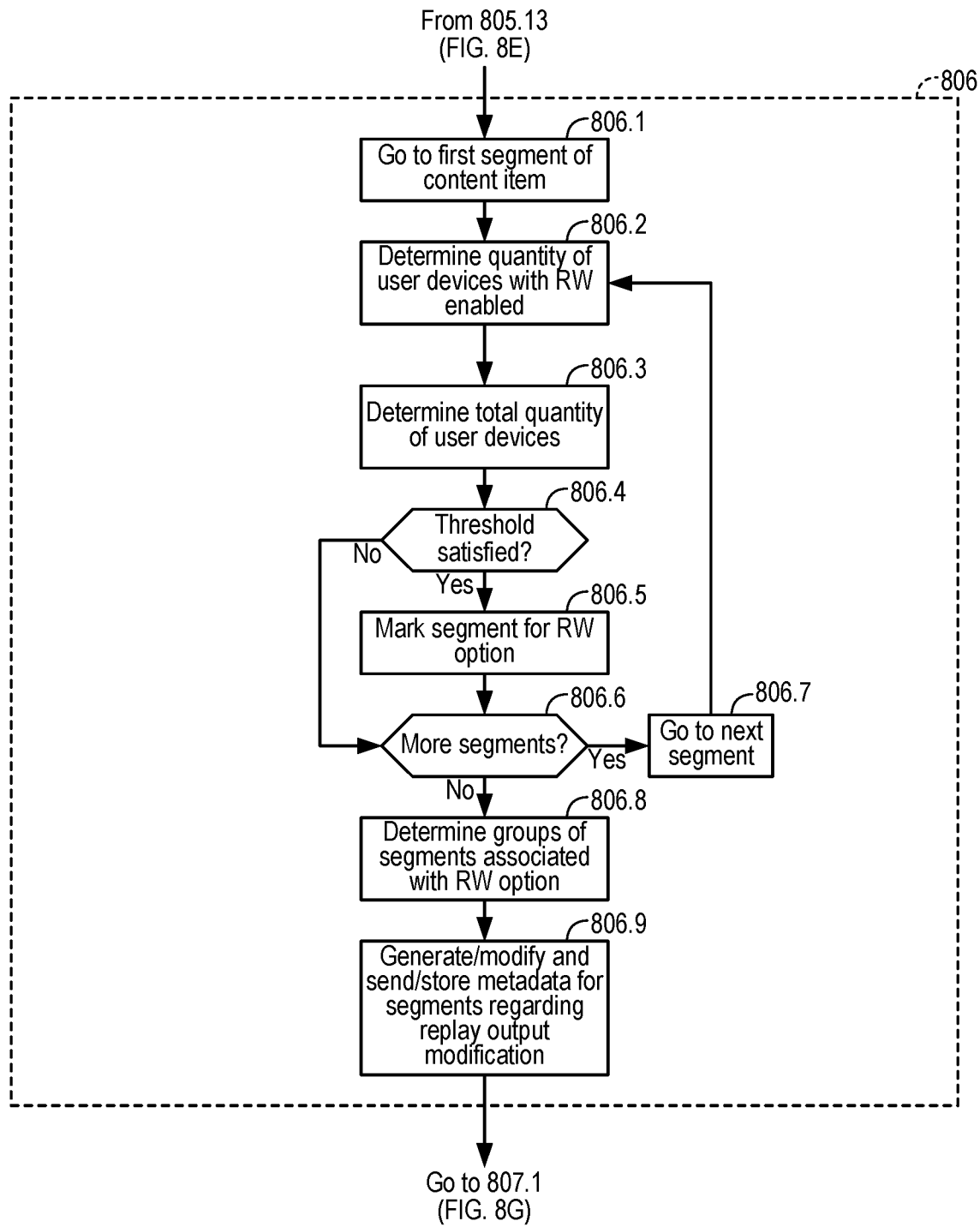

FIG. 8F shows additional details of step 806 of FIG. 8A. In step 806.1, the content annotation server 140 may go to a first segment of the content item and set the first segment as the current segment. In step 806.2, the content annotation server 140 may determine a quantity of user devices, of all the user devices via which the current segment was output, for which rewind trick play was enabled. In step 806.3, the content annotation server 140 may determine the total quantity of user devices via which the current segment was output. In step 806.4, the output annotation server 140 may determine whether a quantity threshold is satisfied by the quantity of user devices for which rewind trick play was enabled for the current segment. The quantity threshold may comprise a percentage (e.g., 50%), and the quantity threshold may be satisfied if the quantity of user devices for which rewind trick play was enabled for the current segment, divided by the total quantity of user devices via which the current segment was output, equals or exceeds the threshold percentage. Other percentages (e.g., 55%, 60%, 70%, 75%, 80%, 85%) may be used for the quantity threshold of step 806.4, and the quantity threshold of step 806.4 may be different from other quantity thresholds described herein.

If the content annotation server 140 determines in step 806.4 that the quantity threshold is satisfied, the current segment may in step 806.5 be marked for inclusion in a group of segments for a portion of the content item to be associated with selective replay. After step 806.5, or after a no determination in step 805.4, the content annotation server 140 may in step 806.6 determine if there are more segments in the content item. If yes, the content annotation server 140 may in step 806.7 go to the next segment and make the next segment the current segment. After step 806.7, the content annotation server 140 may perform step 806.2. If the determination of step 806.6 is no, the content annotation server 140 may in step 806.8 determine, based on the segments marked in step 806.5, groups of those segments that represent portions of the content item to be associated with selective replay. In step 806.9, the content annotation server 140 may, based on the determination of step 806.8, generate metadata (and/or modify existing metadata) for segments of the content item associated with selective replay. The metadata may, for example, include metadata such as was described for metadata elements md(k+s−4) through md(k+w) of FIG. 7D.

Figure 8G:
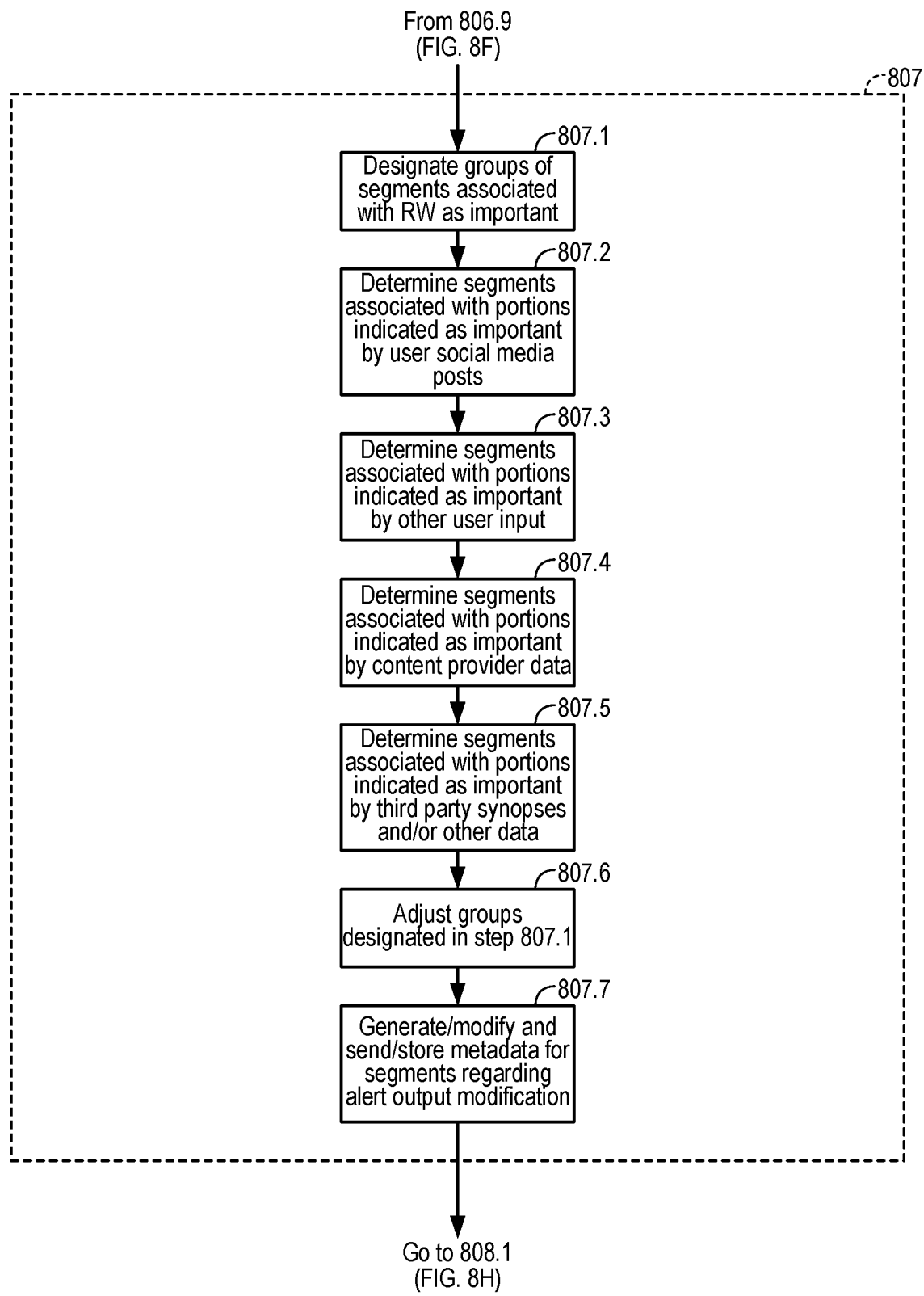

FIG. 8G shows additional details of step 807 of FIG. 8A. In step 807.1, the content annotation server 140 may designate groups of segments, determined in step 806.8 and associated with selective replay, as important portions of the content item. In step 807.2, the content annotation server 140 may determine segments of the content item that are associated with portions indicated as important in social media posts of users associated with the data received in step 804. In step 807.3, the content annotation server 140 may determine segments of the content item that are associated with portions indicated as important in other types of user input. In step 807.4, the content annotation server 140 may determine segments of the content item that are associated with portions indicated as important in data (e.g., summaries, advertisements, trailers, etc.) received from a content provider associated with the content item. In step 807.5, the content annotation server 140 may determine segments of the content item that are associated with portions indicated as important in data (e.g., synopses, plot summaries, reviews, discussions of plays and/or scoring in a sporting event) received from third parties. In step 807.6, the content annotation server 140 may adjust the groups designated in step 807.1 based on the determinations of steps 807.2-807.5. The adjusting of step 807.6 may comprise modifying an existing group to include one or more additional segments, and/or determining a new group. In step 807.7, the content annotation server 140 may, based on the determination of step 807.6, generate metadata (and/or modify existing metadata) for segments of the content item associated with important portions of the content item. The metadata may, for example, include metadata such as was described for metadata elements md(m+1) through md(m+5) of FIG. 7B.

Figure 8H:
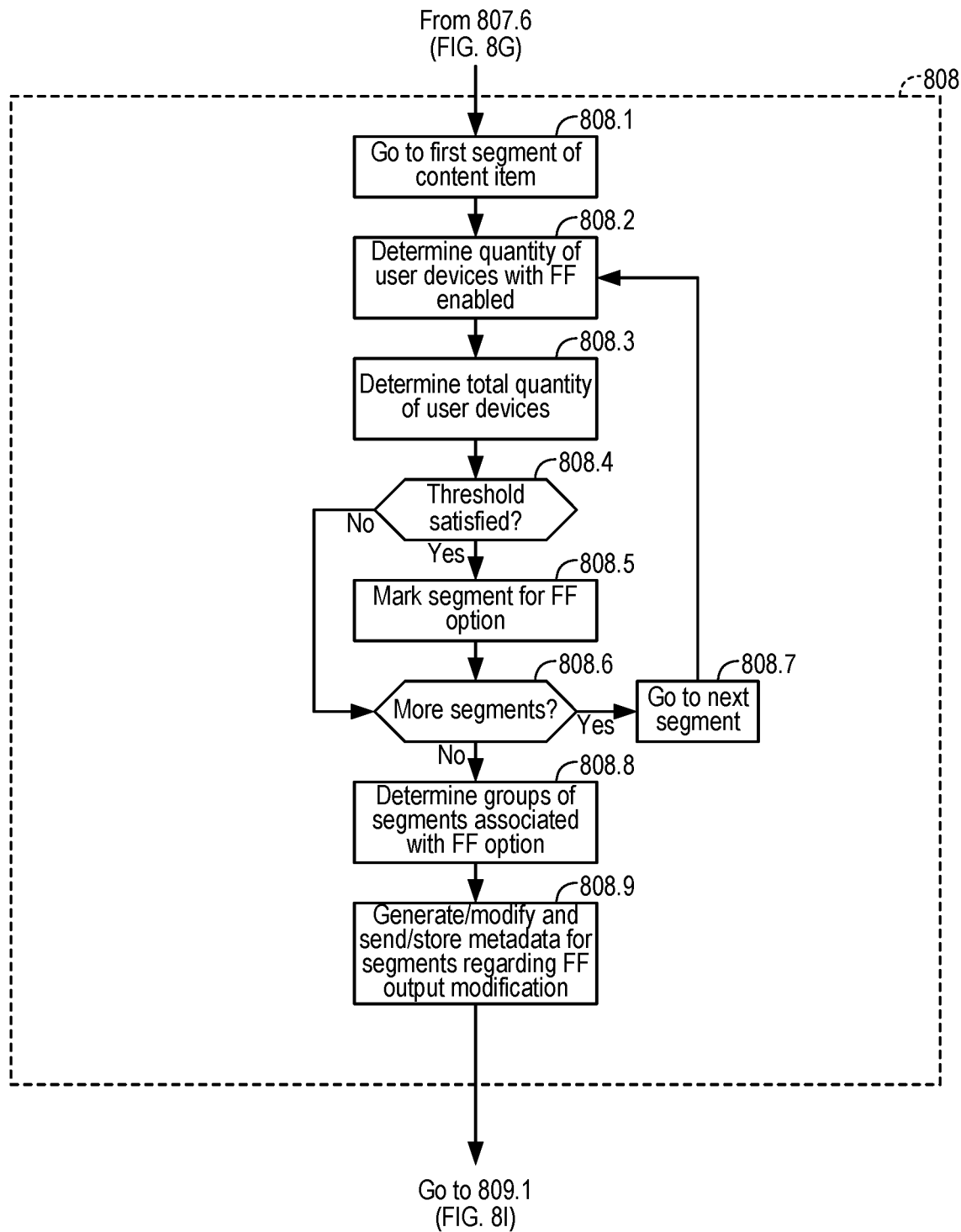

FIG. 8H shows additional details of step 808 of FIG. 8A. In step 808.1, the content annotation server 140 may go to a first segment of the content item and set the first segment as the current segment. In step 808.2, the content annotation server 140 may determine a quantity of user devices, of all the user devices via which the current segment was output, for which fast forward trick play was enabled. In step 808.3, the content annotation server 140 may determine the total quantity of user devices via which the current segment was output. In step 808.4, the output annotation server 140 may determine whether a quantity threshold is satisfied by the quantity of user devices for which fast forward trick play was enabled for the current segment. The quantity threshold may comprise a percentage (e.g., 50%), and the quantity threshold may be satisfied if the quantity of user devices for which fast forward trick play was enabled for the current segment, divided by the total quantity of user devices via which the current segment was output, equals or exceeds the threshold percentage. Other percentages (e.g., 55%, 60%, 70%, 75%, 80%, 85%) may be used for the quantity threshold of step 808.4, and the quantity threshold of step 808.4 may be different from other quantity thresholds described herein.

If the content annotation server 140 determines in step 808.4 that the quantity threshold is satisfied, the current segment may in step 808.5 be marked for inclusion in a group of segments for a portion of the content item to be associated with selective skipping. After step 808.5, or after a no determination in step 808.4, the content annotation server 140 may in step 808.6 determine if there are more segments in the content item. If yes, the content annotation server 140 may in step 808.7 go to the next segment and make the next segment the current segment. After step 808.7, the content annotation server 140 may perform step 808.2. If the determination of step 808.6 is no, the content annotation server 140 may in step 808.8 determine, based on the segments marked in step 808.5, groups of those segments that represent portions of the content item to be associated with selective skipping. In step 808.9, the content annotation server 140 may, based on the determination of step 808.8, generate metadata (and/or modify existing metadata) for segments of the content item associated with selective skipping. The metadata may, for example, include metadata such as was described for metadata elements md(j+1) through md(j+5) and md(j+r+2) of FIG. 7C.

Figure 8I:
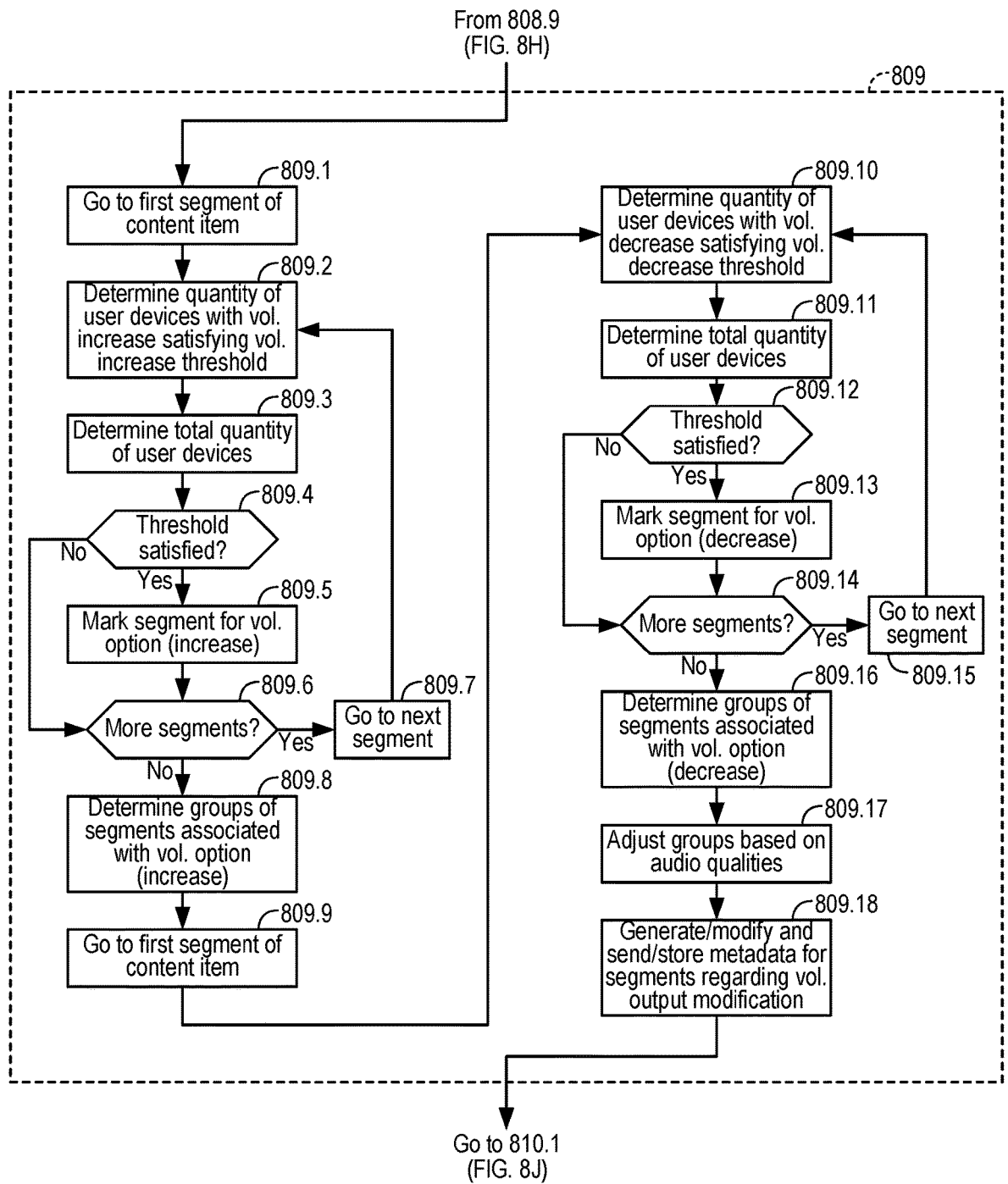

FIG. 8I shows additional details of step 809 of FIG. 8A. In step 809.1, the content annotation server 140 may go to a first segment of the content item and set the first segment as the current segment. In step 809.2, the content annotation server 140 may determine a quantity of user devices, of all the user devices via which the current segment was output, for which there was an increase in volume that satisfied a volume increase threshold. Volume change may, for example, be measured based on percentage change calculated based on numerical values (e.g., 0 to 60) linearly mapped to a range of volume adjustment available on one or more known user devices. For example, a change of a volume setting from 20 to 25 may comprise a volume increase of 25% ((25-20)/20). A volume increase threshold may, for example comprise a percentage (e.g., 10%, 15%, 20%, or 25%). Often, users may increase volume slowly or incrementally, and a volume change may not begin and end during output of a single segment of a content item. Accordingly, the determination of step 809.2 may comprise determining a quantity of user devices for which a total volume increase, over a predetermined number of segments before and/or after the current segment and/or over a predetermined time period before and/or after the current segment, satisfies a volume increase threshold.

In step 809.3, the content annotation server 140 may determine the total quantity of user devices via which the current segment was output. The total quantity of step 809.3 may be an average of the total quantities for each of the segments used to determine the quantity of step 809.2. In step 809.4, the output annotation server 140 may determine whether a quantity threshold is satisfied by the quantity of user devices for which there was a volume increase satisfying a volume increase threshold. The quantity threshold may comprise a percentage (e.g., 50%), and the quantity threshold may be satisfied if the quantity of user devices for which there was a volume increase satisfying a volume increase threshold, divided by the total quantity of user devices via which the current segment was output, equals or exceeds the threshold percentage. Other percentages (e.g., 55%, 60%, 70%, 75%, 80%, 85%) may be used for the quantity threshold of step 809.4, and the quantity threshold of step 809.4 may be different from other quantity thresholds described herein.

If the content annotation server 140 determines in step 809.4 that the quantity threshold is satisfied, the current segment may in step 809.5 be marked for inclusion in a group of segments for a portion of the content item to be associated with an increase volume adjustment. After step 809.5, or after a no determination in step 809.4, the content annotation server 140 may in step 809.6 determine if there are more segments in the content item. If yes, the content annotation server 140 may in step 809.7 go to the next segment and make the next segment the current segment. After step 809.7, the content annotation server 140 may perform step 809.2. If the determination of step 809.6 is no, the content annotation server 140 may in step 809.8 determine, based on the segments marked in step 809.5, groups of those segments that represent portions of the content item to be associated with an increase volume adjustment.

In step 809.9, the content annotation server 140 may go to the first segment of the content item and set the first segment as the current segment. In step 809.10, the content annotation server 140 may determine a quantity of user devices, of all the user devices via which the current segment was output, for there was a decrease in volume that satisfied a volume decrease threshold. A volume decrease calculation may be similar to a volume increase calculation, and a volume decrease threshold may also comprise a percentage (e.g., −10%, −15%, 20%, or −25%). In step 809.11, the content annotation server 140 may determine the total quantity of user devices via which the current segment was output. The quantity in step 809.11 may be calculated similar to the calculation of the quantity in step 809.3. In step 809.12, the output annotation server 140 may determine whether a quantity threshold is satisfied by the quantity of user devices for which there was a volume decrease satisfying a volume decrease threshold. The quantity threshold may comprise a percentage (e.g., 50%), and the quantity threshold may be satisfied if the quantity of user devices for which there was a volume decrease satisfying a volume decrease threshold, divided by the total quantity of user devices via which the current segment was output, equals or exceeds the threshold percentage. Other percentages (e.g., 55%, 60%, 70%, 75%, 80%, 85%) may be used for the quantity threshold of step 809.12, and the quantity threshold of step 809.12 may be different from other quantity thresholds described herein.

If the content annotation server 140 determines in step 809.12 that the quantity threshold is satisfied, the current segment may in step 809.13 be marked for inclusion in a group of segments for a portion of the content item to be associated with a decrease volume adjustment. After step 809.13, or after a no determination in step 809.12, the content annotation server 140 may in step 809.14 determine if there are more segments in the content item. If yes, the content annotation server 140 may in step 809.15 go to the next segment and make the next segment the current segment. After step 809.15, the content annotation server 140 may perform step 809.10 If the determination of step 809.14 is no, the content annotation server 140 may in step 809.16 determine, based on the segments marked in step 809.13, groups of those segments that represent portions of the content item to be associated with a decrease volume adjustment.

In step 809.17, the content annotation server 140 may adjust the groups determined in steps 809.8 and 809.16 based on audio qualities of the content item. For example, using one or more audio analysis software programs, the content annotation server 140 may determine portions of the audio for which overall volume is below a predetermined threshold and for which a volume increase may be beneficial and/or portions of the audio for which overall volume is above a predetermined threshold and for which a volume decrease may be beneficial. The adjusting of step 809.17 may comprise modifying an existing group to include one or more additional segments, and/or determining a new group. In step 809.18, the content annotation server 140 may, based on the determinations of steps 809.8, 809.17, and 809.17, generate metadata (and/or modify existing metadata) for segments of the content item associated with volume adjustment. The metadata may, for example, include volume-related metadata such as was described for metadata elements md(p+1) through md(p+6) of FIG. 7E. As part of step 809.18, the content annotation server 140 may cause that generated/modified metadata to be stored in the selective output modification database 142.

Figure 8J:
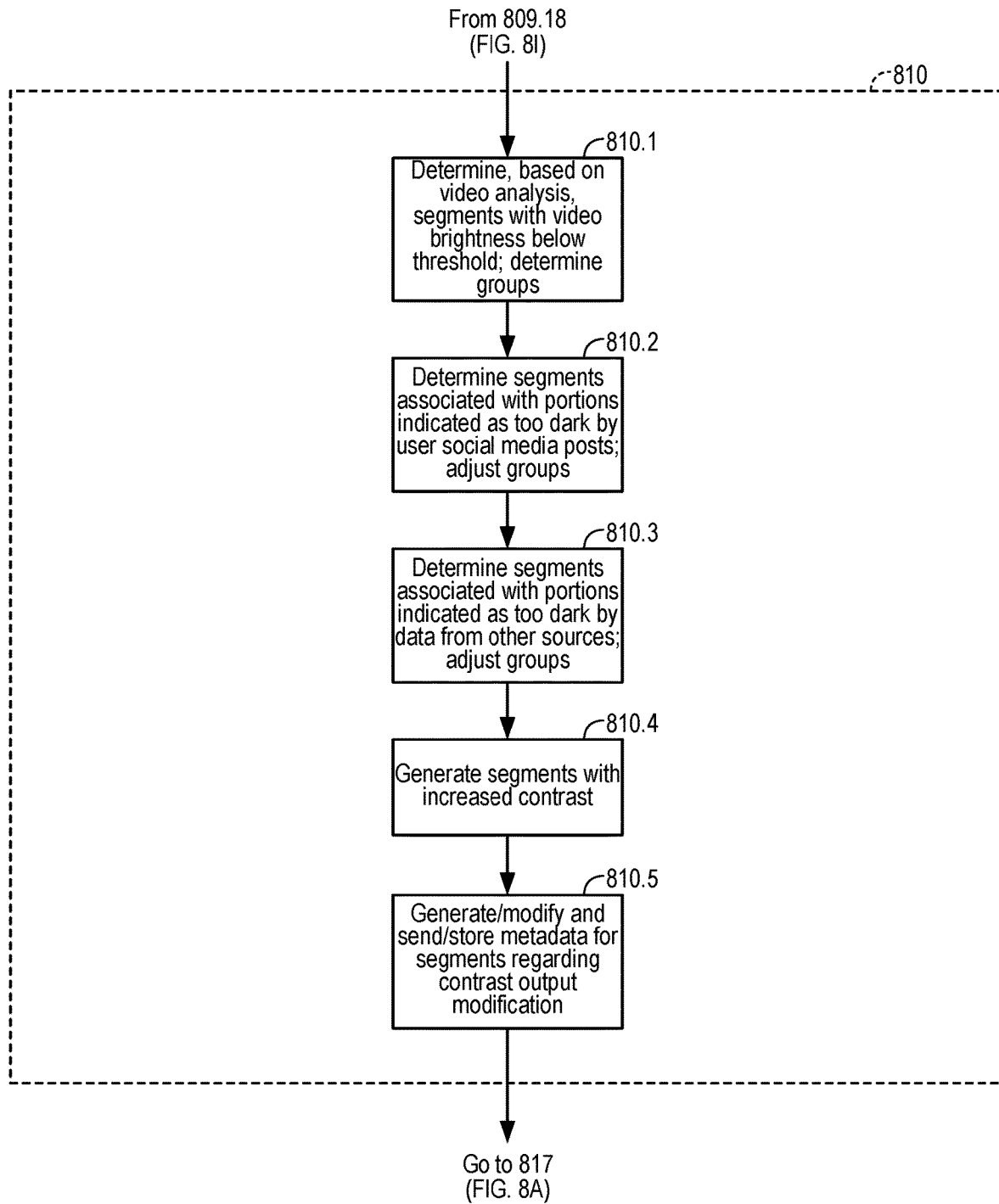

FIG. 8J shows additional details of step 810 of FIG. 8A. In step 810.1, the content annotation server 140 may use one or more video analysis programs to determine segments of the content item for which brightness is below a brightness threshold, and may determine, based on those segments, groups of those segments that represent portions of the content item to be associated with contrast adjustment. In step 810.2, the content annotation server 140 may determine segments associated with portions of the content item indicated as too dark by social media posts of users associated with the data received in step 804. As part of step 810.2, the content annotation server may adjust groups determined in step 810.1 (e.g., by adding one or more segments to existing groups and/or by creating new groups). In step 810.3, the content annotation server 140 may determine segments associated with portions of the content item indicated as too dark by data from other sources (e.g., customer complaints, reviews of content items). As part of step 810.3, the content annotation server may adjust groups determined in step 810.1 and/or in step 810.2 (e.g., by adding one or more segments to existing groups and/or by creating new groups). In step 810.4, the content annotation server may generate, for portions of the content item corresponding to the groups determined in steps 810.1-810.3, segments for alternate versions of those portions of the content item. The generating of step 810.4 may comprise transcoding segments to increase contrast. In step 810.5, the content annotation server 140 may, based on the determinations of steps 810.1-810.3, generate metadata (and/or modify existing metadata) for segments of the content item associated with contrast adjustment. The metadata may, for example, comprise contrast-related metadata such as was described for metadata elements md(p+1) through md(p+6) of FIG. 7E. As part of step 810.5, the content annotation server 140 may cause that generated/modified metadata, together with segments generated in step 810.4, to be stored in the selective output modification database 142.

As described above, modified output of content item portions may comprise output of segments modified to have higher contrast. Output of higher contrast segments may occur automatically and/or based on a user accepting an output modification option associated with a prompt. Also or alternatively, such modified output may be caused based on ambient light conditions associated with a display device such as the display device 401. For example, in bright conditions (e.g., direct sunlight falling on a display screen), darker videos may be more difficult to see. A user device may determine, based on data from one or more cameras or other sensors associated with a display device and/or a room in which a display device is located, that an ambient light level is above a predetermined threshold. Metadata may be added to metadata elements for segments preceding a darker portion of a content item and may include instructions that cause switching to the B stream to receive data for an alternate version of that portion (e.g., a version transcoded to increase contrast). Also or alternatively, during step 810, the content annotation server may use multiple thresholds to determine dark portions of a content item. A first threshold may be used to determine first portions of a content item for which alternate versions may be made available under all ambient lighting conditions, and a second threshold (e.g., corresponding to a less dark video than the first threshold) may be used to determine second portions of a content item for which alternate versions may be made available under high ambient lighting conditions. Different metadata may be used for the first and second portions to facilitate modification based on ambient lighting conditions.

As also described above, a user device may cause volume adjustment by sending commands via an HDMI CEC pin. Also or alternatively, such commands may be sent to certain types of user devices (e.g., smart televisions) via web interfaces of those user devices. If a web interface of a user device is available, other types of control commands (e.g., to adjust contrast or other video characteristics) may also be communicated via that web interface in a manner similar to volume control commands.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:
1. A method comprising:
   determining, based on data indicating that a plurality of users requested output of closed captioning for a first portion of a content item, that a sufficient number of users requested the output of closed captioning for the first portion of the content item;
   receiving a request for the content item; and
   causing, based on the received request for the content item, based on the determining, and based on receiving acceptance of an option to output the first portion with closed captioning:

output, with closed captioning, of the first portion of the content item; and output, without closed captioning, of one or more other portions of the content item.

2. The method of claim 1, wherein the receiving the request comprises receiving the request from a user device, and wherein the method further comprises:

receiving, from the user device, an indication of a user preference to enable selective closed captioning, and wherein the causing output of the first portion is based on the indication.

3. The method of claim 1, wherein the determining comprises determining that a quantity of the plurality of users satisfies a quantity threshold.

4. The method of claim 1, further comprising:

determining, for a second portion of the content item, that audio for the second portion comprises dialogue spoken with an accent; and causing, based on the determining that the audio for the second portion comprises dialogue spoken with an accent, output of the second portion with closed captioning.

5. The method of claim 1, further comprising:

determining, for a second portion of the content item, that audio for the second portion comprises dialogue spoken by one or more predetermined persons; and causing, based on the determining that the audio for the second portion comprises dialogue spoken by one or more predetermined persons, output of the second portion with closed captioning.

6. The method of claim 1, wherein the causing output of the first portion comprises sending instructions to enable closed captioning for the first portion.

7. The method of claim 1, further comprising causing, prior to output of the first portion, output of a prompt for acceptance of the option to output the first portion with closed captioning.

8. The method of claim 1, wherein the causing output of the one or more other portions comprises causing, without further input from a user, disabling of closed captioning output for a portion, of the one or more other portions, immediately following the first portion.

9. The method of claim 1, wherein the data comprises data indicating importance of a second portion of the content item, wherein the causing comprises causing output of the first portion and of the one or more other portions via a user device, and wherein the method further comprises:

causing output, based on one or more indications of distraction of one or more users associated with the user device, of an alert indicating upcoming output of the second portion.

10. The method of claim 1, wherein the data comprises data indicating a second portion of the content item for which a second plurality of users requested fast forwarding, and wherein the method further comprises:

causing, based on the received request for the content item, output of the content item without the second portion.

11. The method of claim 1, wherein the data comprises data indicating a second portion of the content item for which a second plurality of users requested rewinding, and wherein the method further comprises:

causing, based on the received request for the content item, output of the content item with replay of the second portion.

12. The method of claim 1, wherein the data comprises data indicating a second portion of the content item for which a second plurality of users adjusted audio volume, and wherein the method further comprises:

causing, based on the received request for the content item, output of the second portion with a volume adjustment based on the data indicating the second portion of the content item for which the second plurality of users adjusted audio volume.

13. The method of claim 1, further comprising:

determining video of a second portion of the content item comprises brightness below a brightness threshold; and causing, based on the received request for the content item, output of the second portion with a contrast adjustment.

14. The method of claim 1, wherein the data comprises data indicating a second portion of the content item for which a second plurality of users requested modified output, and wherein the method further comprises:

determining, based on the data indicating the second portion of the content item for which the second plurality of users requested modified output, that a threshold is satisfied by the second plurality of users; and causing, based on the received request for the content item and based on the determining that the threshold is satisfied:

output, based on a first stream and without modification, of one or more third portions of the content item, and output, based on a second stream and based on a modification corresponding to the requested modified output, of a portion of the content item.

15. A method comprising:

designating, based on data indicating that a plurality of users requested rewinding for a first portion of a content item, the first portion as an important portion of the content item;

receiving a request for the content item;

causing, based on the request, output of the content item via a user device;

receiving an indication that a user, associated with the user device, is distracted; and causing, based on the designation of the first portion as an important portion and based on the received indication, output of an alert indicating upcoming output of the first portion.

16. The method of claim 15, wherein the causing output of the content item comprises sending, based on the designation of the first portion as an important portion and for a second portion of the content item preceding the first portion, metadata indicating modified output, based on user distraction, of the second portion to comprise the alert.

17. The method of claim 15, wherein the alert comprises one or more of an audio alert or a video alert output with a second portion of the content item preceding the first portion.

18. A method comprising:

determining, based on data indicating a first portion of a content item for which a plurality of users requested modified output, that a sufficient number of users requested the modified output of the first portion of the content item;

receiving a request for the content item; and causing, based on the received request for the content item, based on the determining, and based on receiving acceptance of an option for the modified output of the first portion:

output, based on a first stream and without modification, of one or more second portions of the content item, and output, based on a second stream and based on a modification corresponding to the requested modified output, of a portion of the content item.

19. The method of claim 18, wherein the requested modified output comprises fast forwarding, wherein the modification corresponding to the requested modified output comprises skipping the first portion, and wherein the output based on the second stream comprises output of a third portion immediately following the first portion.

20. The method of claim 18, wherein the requested modified output comprises rewinding, wherein the modification corresponding to the requested modified output comprises replay of the first portion, and wherein the output based on the second stream comprises a repeat output of the first portion.

* * * * *